US011877264B2

(12) United States Patent
Oteri et al.

(10) Patent No.: US 11,877,264 B2
(45) Date of Patent: Jan. 16, 2024

(54) COLLISION MITIGATION FOR DIRECTIONAL RESPONSE IN MILLIMETER WAVE WIRELESS LOCAL AREA NETWORK SYSTEM

(71) Applicant: InterDigital Patent Holdings, Inc., Wilmington, DE (US)

(72) Inventors: Oghenekome Oteri, San Diego, CA (US); Hanqing Lou, Syosset, NY (US); Xiaofei Wang, North Caldwell, NJ (US); Li-Hsiang Sun, San Diego, CA (US); Rui Yang, Greenlawn, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/738,672

(22) Filed: May 6, 2022

(65) Prior Publication Data

US 2022/0264548 A1   Aug. 18, 2022

Related U.S. Application Data

(63) Continuation of application No. 16/492,233, filed as application No. PCT/US2018/021932 on Mar. 12, 2018, now Pat. No. 11,363,589.

(Continued)

(51) Int. Cl.
*H04W 72/04* (2023.01)
*H04W 72/044* (2023.01)
(Continued)

(52) U.S. Cl.
CPC ......... *H04W 72/044* (2013.01); *H04L 5/0055* (2013.01); *H04W 16/28* (2013.01); *H04W 84/12* (2013.01)

(58) Field of Classification Search
CPC ... H04W 72/044; H04W 16/28; H04W 84/12; H04L 5/0055; H01Q 3/26
See application file for complete search history.

(56) References Cited

U.S. PATENT DOCUMENTS 10,405,348 B2   9/2019 Islam et al.
10,412,636 B2   9/2019 Cordeiro
(Continued)

FOREIGN PATENT DOCUMENTS

KR   20160031514 A   3/2016

OTHER PUBLICATIONS

Handte et al., "Improvements to enhanced SLS beamforming," IEEE 802.11-17/0770r0 (May 9, 2017).

(Continued)

*Primary Examiner* — Tuan H Nguyen
(74) *Attorney, Agent, or Firm* — Flaster Greenberg P.C.

(57) ABSTRACT

A method, apparatus, and system for beamforming training using a wireless transmit receive unit (WTRU). A WTRU may receive an indication of a number of space time slots (STSs) from an access point (AP) within a beacon frame during a beamforming training allocation. The WTRU may send a response signal to the AP in a specific STS based on a function of the number of STSs. The WTRU may receive an acknowledgement (ACK) from the AP confirming the response was received. Alternatively, the AP may send a signal indicating that a collision occurred and alter the number of STSs, and the WTRU may try again in the next beamforming training allocation.

28 Claims, 18 Drawing Sheets

Related U.S. Application Data

(60) Provisional application No. 62/469,754, filed on Mar. 10, 2017.

(51) Int. Cl.
  *H04L 5/00* (2006.01)
  *H04W 16/28* (2009.01)
  *H04W 84/12* (2009.01)

(56) References Cited

U.S. PATENT DOCUMENTS

| | | | |
|---|---|---|---|
| 2010/0214169 A1* | 8/2010 | Kafle | H01Q 3/26 342/368 |
| 2011/0064033 A1 | 3/2011 | Gong et al. | |
| 2011/0080898 A1 | 4/2011 | Cordeiro et al. | |
| 2011/0205969 A1 | 8/2011 | Ahmad et al. | |
| 2013/0059544 A1* | 3/2013 | Chen | H04W 8/005 455/67.11 |
| 2015/0049744 A1 | 2/2015 | Liu et al. | |
| 2015/0382171 A1 | 12/2015 | Roy et al. | |
| 2017/0111099 A1 | 4/2017 | Jo et al. | |
| 2018/0254810 A1 | 9/2018 | Kim et al. | |

OTHER PUBLICATIONS

Maltsev et al., "Enhanced SLS BF flow for efficient AP-STA access in dense environment," 802.11-17/0067r0 (Jan. 2017).
Agilent Technologies, "Wireless LAN and 60 GHz—IEEE 802.11ad Explained," pp. 1-28 (May 20, 2013).
Chen et al., "MAC and PHY Proposal for 802.11af," IEEE 802.11-10/0258r0 (Mar. 2010).
Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Enhancements for Very High Throughput for Operation in Bands below 6GHz, IEEE P802.11ac/D1.0 (May 2011).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 7: Enhanced Throughput for Operation in License-Exempt Bands above 45 GHz, IEEE P802.11ay/D1.0 (Nov. 2017).
Draft Standard for Information Technology—Telecommunications and Information Exchange Between Systems—Local and Metropolitan Area Networks—Specific Requirements—Part 11: Wireless LAN Medium Access Channel (MAC) and Physical Layer (PHY) Specifications—Amendment 7: Enhanced throughput for operation in license-exempt bands above 45 Ghz, IEEE P802.11ay/D0.2 (Jan. 2017).
Halasz, "Sub 1 GHz license-exempt PAR and 5C," IEEE P802.11 Wireless LANs, IEEE 802.11-10/0001r13 (Jul. 2010).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
Maltsev et al., "Enhanced SLS BF flow for efficient AP-STA access in dense environment," 802.11-17/xxxx (802.11-17/0067r1) (Jan. 2017).
Nitsche et al., "IEEE 802.11ad: Directional 60 GHz Communication for Multi-Gigabit-per-second Wi-Fi," IEEE Communications Magazine, vol. 52, No. 12, pp. 132-141 (Dec. 2014).
Sun et al., "IEEE 802.11 TGay Use Cases," IEEE 802.11-2015/0625r2 (May 2015).

\* cited by examiner

| Bits: | 9 | 2 | 5 | 1 | 7 |
|---|---|---|---|---|---|
| | Total Sectors in ISS | Number of RX DMG Antennas | Reserved | Poll Required | Reserved |
| | B0  B8 | B9  B10 | B11  B15 | B16 | B17  B23 |
| | 601 | 602 | 603 | 604 | 605 |

| Bits: | 6 | 2 | 8 | 1 | 7 |
|---|---|---|---|---|---|
| | Sector Select | DMG Antenna Select | SNR Report | Poll Required | Reserved |
| | B0  B5 | B6  B7 | B8  B15 | B16 | B17  B23 |
| | 621 | 622 | 623 | 624 | 625 |

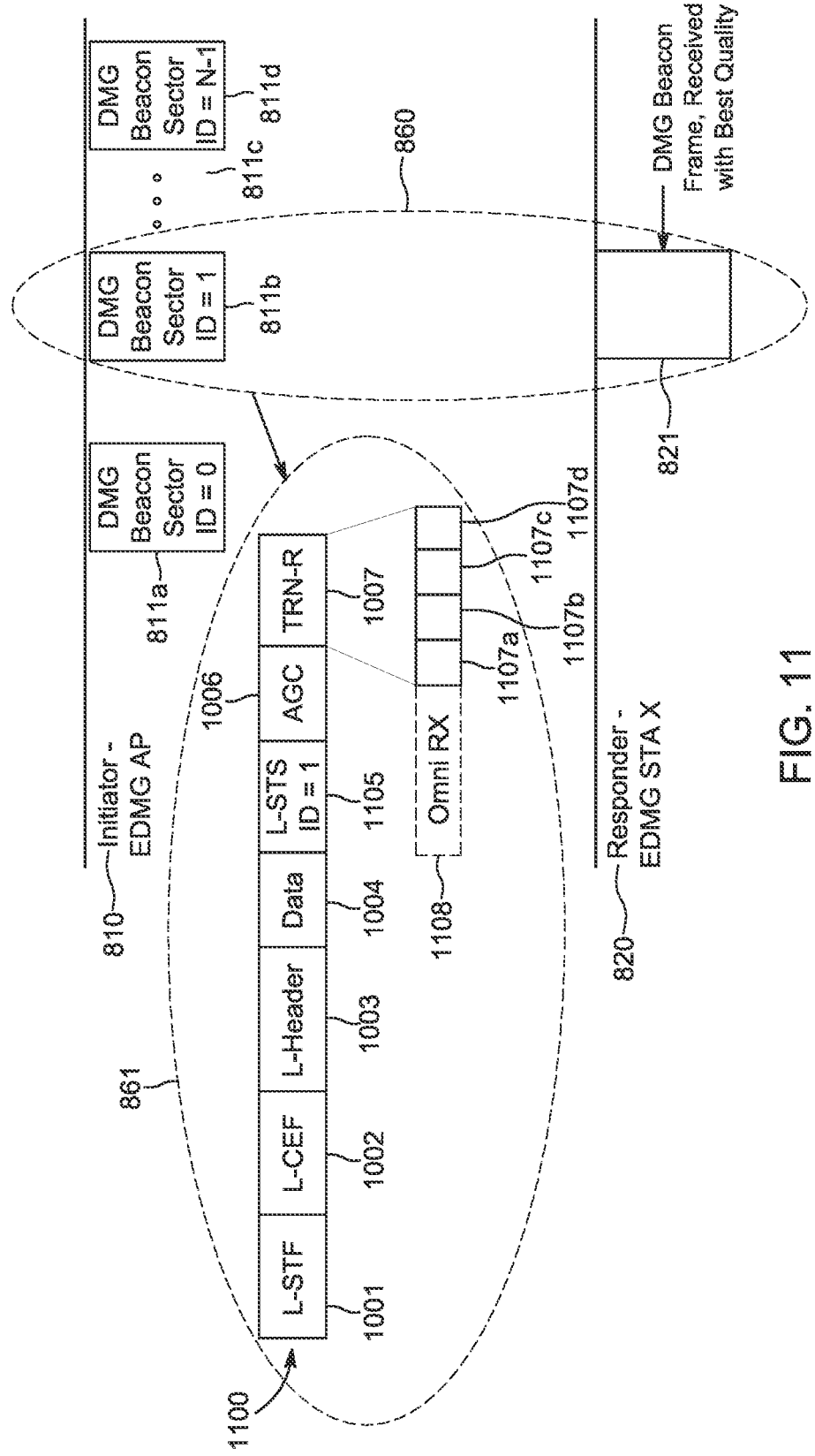

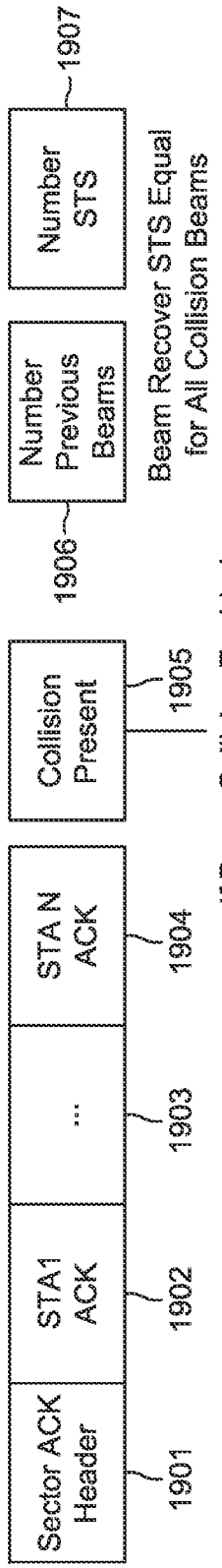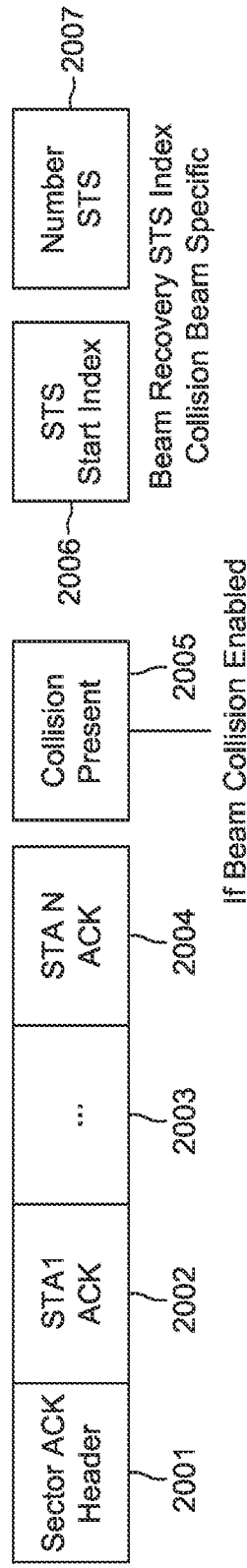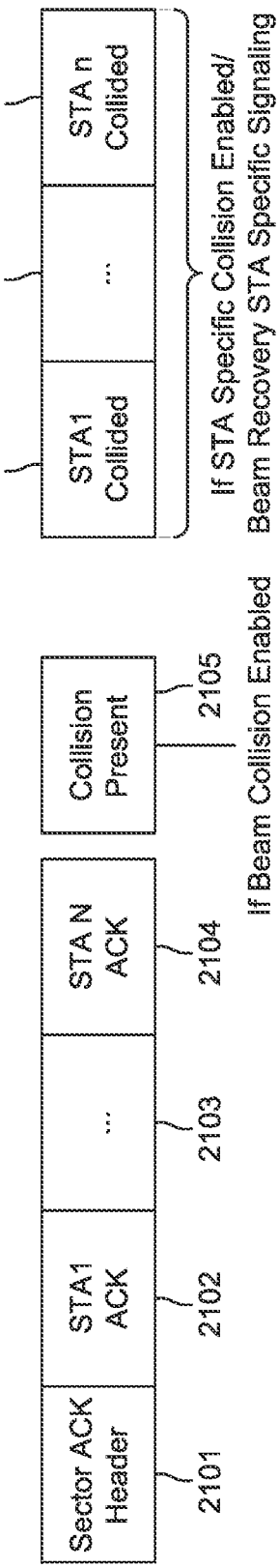

COLLISION MITIGATION FOR DIRECTIONAL RESPONSE IN MILLIMETER WAVE WIRELESS LOCAL AREA NETWORK SYSTEM

CROSS-REFERENCE TO RELATED APPLICATIONS

This application is a continuation of U.S. Non-Provisional patent application Ser. No. 16/492,233, filed on Sep. 9, 2019, which is the U.S. National Stage, under 35 U.S.C. § 371, of International Application No. PCT/US2018/021932 filed Mar. 12, 2018, which claims the benefit of U.S. Provisional Patent Application No. 62/469,754, filed on Mar. 10, 2017, the contents of which is hereby incorporated by reference herein.

BACKGROUND

In next generation mobile communications, there may be applications such as enhanced mobile broadband (eMBB), massive Machine Type Communications (mMTC) and/or Ultra-Reliable Low Latency Communications (URLLC). These applications may use a wide range of spectrum bands ranging from 700 MHz to 80 GHz. There may be a need to address issues that may arise in the wireless protocols for these new applications.

SUMMARY

A method, apparatus, and system for beamforming training using a wireless transmit receive unit (WTRU). A WTRU may receive an indication of a number of space time slots (STSs) from an access point (AP) within a beacon frame during a beamforming training allocation. The WTRU may send a response signal to the AP in a specific STS based on a function of the number of STSs. The WTRU may receive an acknowledgement (ACK) from the AP confirming the response was received. Alternatively, the AP may send a signal indicating that a collision occurred and alter the number of STSs, and the WTRU may try again in the next beamforming training allocation.

BRIEF DESCRIPTION OF THE DRAWINGS

A more detailed understanding of the drawings may be had from the following description but is not intended to limit the scope of the embodiments but to merely serve as examples in conjunction with the accompanying drawings, wherein like reference numerals in the figures indicate like elements, and wherein:

FIG. 6A is an example of an SSW feedback field in an SSW frame;

FIG. 6B is an example of an SSW feedback field in an SSW frame;

FIG. 10 illustrates an example of configuration of the (space-time-slot) STS length in the directional multi-gigabit (DMG) beacon frame;

FIG. 11 illustrates an example of signaling the number of STS per beam;

FIG. 19 illustrates an example of sector ACK frame with equal collision recovery STS;

FIG. 20 illustrates an example of sector ACK frame with collision beam specific recovery STS;

FIG. 21 illustrates an example of sector ACK frame with collision identification and STA specific beam collision/recovery signaling.

DETAILED DESCRIPTION

Figure 1A:
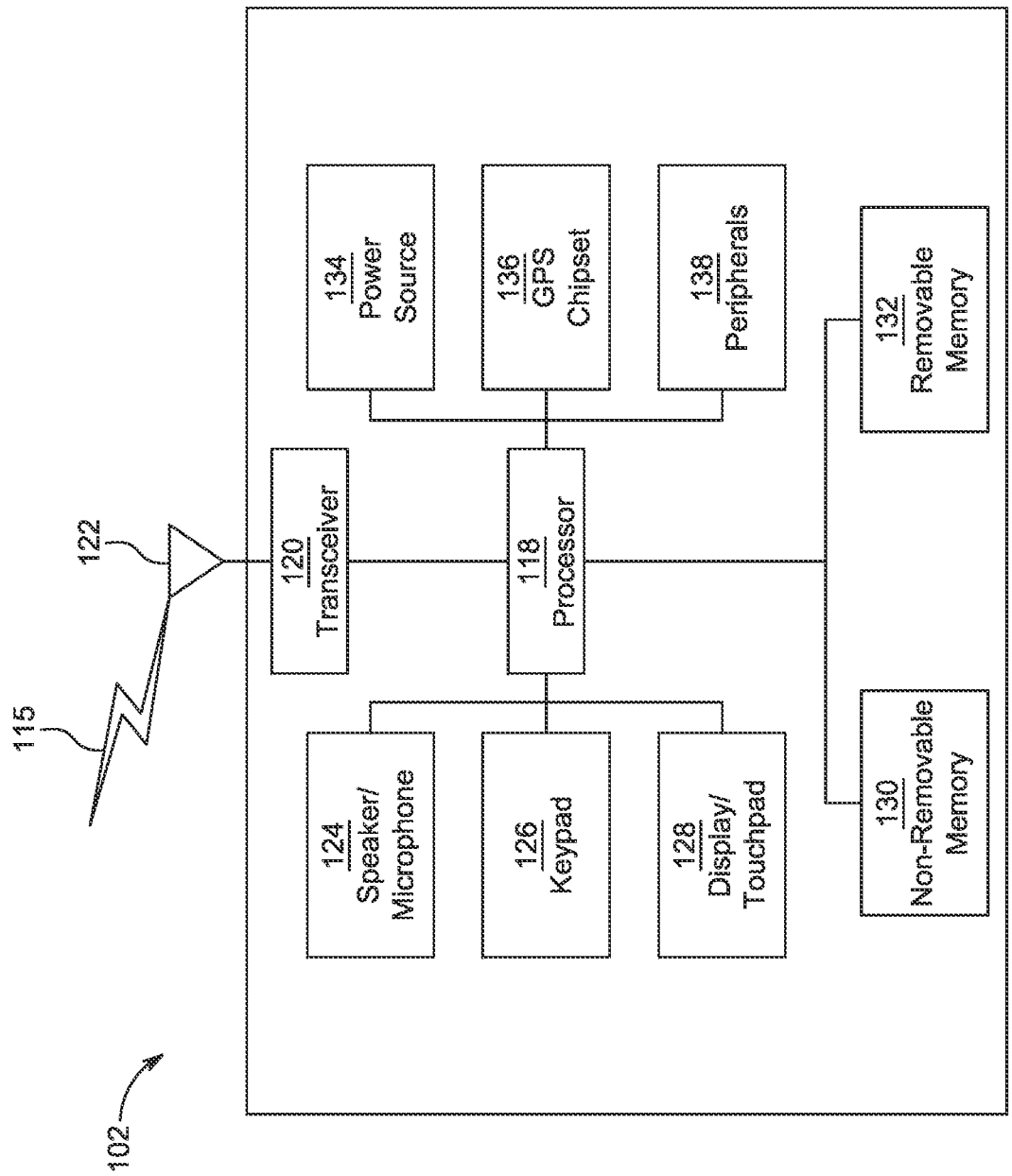
FIG. 1A is a system diagram of an example wireless transmit/receive unit (WTRU)

FIG. 1A is a diagram of an example device 102, such as a wireless transmit receive unit (WTRUA). As discussed herein, a WTRU may be interchangeable with an access point (AP), a station (STA), a user equipment (UE), a mobile device, a fixed or mobile subscriber unit, a pager, a cellular telephone, a personal digital assistant (PDA), a smartphone, a laptop, a netbook, a tablet, an Internet of Things device, a personal computer, a wireless sensor, consumer electronics, a base station, and the like.

The device 102, may be used in one or more of the communications systems described herein. As shown in FIG. 1A, the device 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It should be appreciated that the device 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the device 102 to operate in a wireless environment. The processor 118 may be coupled to the transceiver 120, which may be coupled to the transmit/receive element 122. While FIG. 1A depicts the processor 118 and the transceiver 120 as separate components, it should be appreciated that the processor 118 and the transceiver 120 may be integrated together in an electronic package or chip.

Additionally, the processor 118 may comprise one or more processors. For example, the processor 118 may comprise one or more of: a general purpose processor, a special purpose processor (e.g., a baseband processor, a MAC processor, etc.), a digital signal processor (DSP), Application Specific Integrated Circuits (ASICs), Field Programmable Gate Array (FPGAs) circuits, any other type of integrated circuit (IC), a state machine, and the like. The one or more processor(s) 118 may be integrated or not integrated with each other. The processor 118 (e.g., the one or more processors or a subset thereof) may be integrated with one or more other elements/functions (e.g., other functions such as memory). The processor 118 may perform signal coding, data processing, power control, input/output processing, modulation, demodulation, and/or any other functionality that may enable the device to operate in a wireless environment, such as a WLAN. The processor 118 may be configured to execute processor executable code (e.g., instructions) including, for example, software and/or firmware instructions. For example, the processor 118 may be configured to execute computer readable instructions included on one or more of the processors (e.g., a chipset that includes memory and a processor) or memory. Execution of the instructions may cause the device to perform one or more of the functions described herein.

The transmit/receive element 122 may be configured to transmit signals to, or receive signals from, a base station over an air interface 115. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It should be appreciated that the transmit/receive element 122 may be configured to transmit and/or receive any combination of wireless signals.

In addition, although the transmit/receive element 122 is depicted in FIG. 1A as a single element, the device 102 may include any number of transmit/receive elements 122. The transmit/receive element 122 may include one or more antennas. More specifically, the device 102 may employ multiple input multiple output (MIMO) techniques. Thus, in one embodiment, the device 102 may include two or more transmit/receive elements 122 (e.g., multiple antennas) for transmitting and receiving wireless signals over the air interface 116. The one or more antennas may receive a radio signal. The processor may receive the radio signal, e.g., via the one or more antennas. The one or more antennas may transmit a radio signal (e.g., based on a signal sent from the processor).

The transceiver 120 may be configured to modulate the signals that are to be transmitted by the transmit/receive element 122 and to demodulate the signals that are received by the transmit/receive element 122. As noted above, the device 102 may have multi-mode capabilities. Thus, the transceiver 120 may include multiple transceivers for enabling the device 102 to communicate via multiple Radio Access Technologies (RATs), such as UTRA and IEEE 802.11, for example.

The processor 118 of the device 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also facilitated output to the user via speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

Further, the device 102 memory (130 and/or 132) that may include one or more elements/components/units for storing programming and/or data, such as processor executable code or instructions (e.g., software, firmware, etc.), electronic data, databases, or other digital information. The memory (130 and/or 132) may include one or more memory units. One or more memory (130 and/or 132) units may be integrated with one or more other functions (e.g., other functions included in the device, such as the processor). The memory (130 and/or 132) may include a read-only memory (ROM) (e.g., erasable programmable read only memory (EPROM), electrically erasable programmable read only memory (EEPROM), etc.), random access memory (RAM), magnetic disk storage media, optical storage media, flash memory devices, and/or other non-transitory computer-readable media for storing information. The memory (130 and/or 132) may be coupled to the processor 118. The processor 118 may communicate with one or more entities of memory (130 and/or 132), such as via a system bus, directly, or the like.

The processor 118 may receive power from the power source 134, and may be configured to distribute and/or control the power to the other components in the WTRU 102. The power source 134 may be any suitable device for powering the device 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the device 102 may receive location information over the air interface 115 from a base station and/or determine its location based on the timing of the signals being received from two or more nearby base stations. It should be appreciated that the device 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1B:
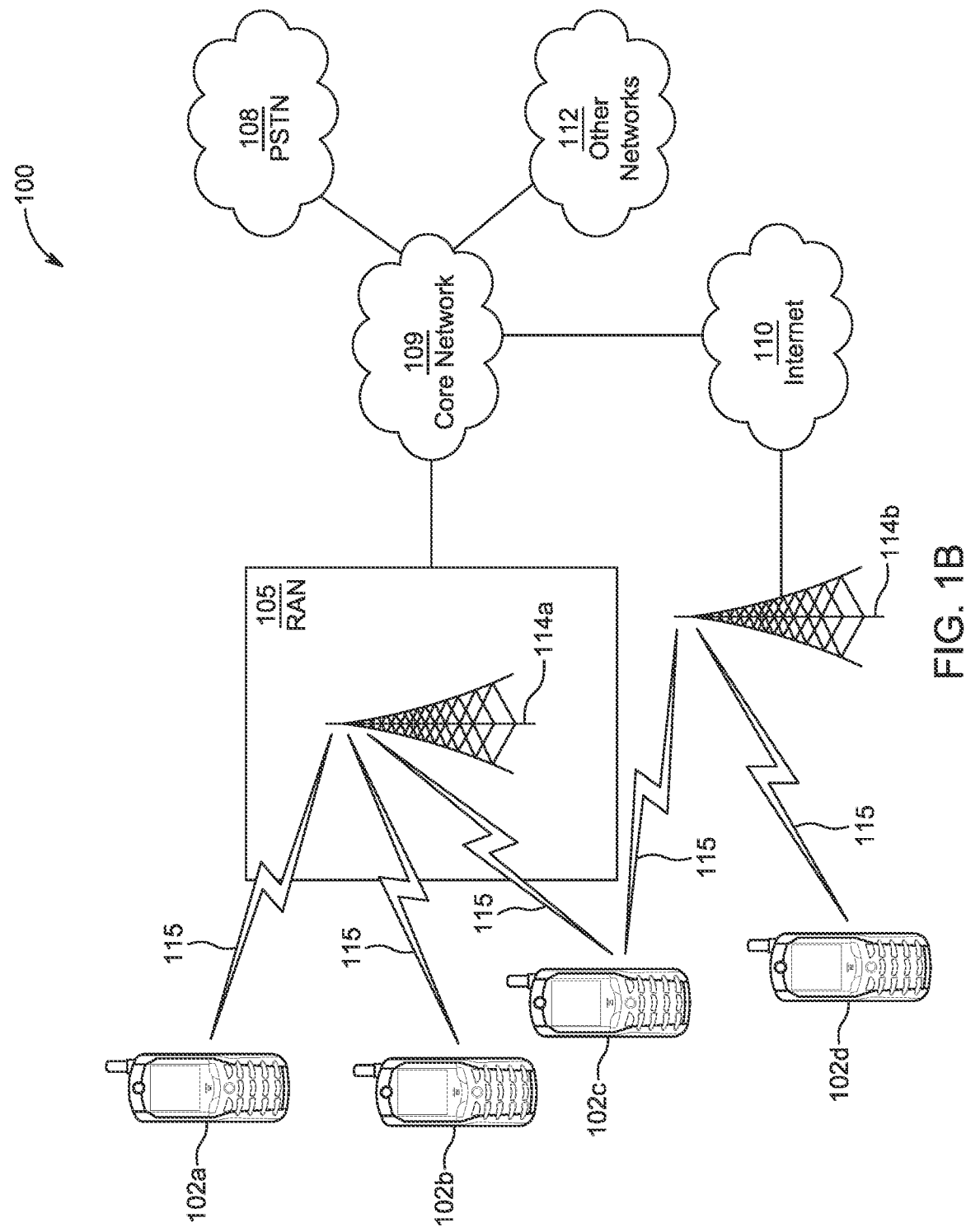
FIG. 1B is a system diagram of an example radio access network and/or an example core network.

FIG. 1B is a diagram showing an example communications system 100 that may include at least one wireless transmit/receive unit (WTRU), such as a plurality of WTRUs, for instance WTRUs 102a, 102b, 102c, and 102d, one or more base stations 114a and 114b, a radio access network (RAN) 105, a core network 109, a public switched telephone network (PSTN) 108, the Internet 110, and other networks 112, though it should be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station (e.g., a WLAN STA), a fixed or mobile subscriber unit, a pager, a cellular telephone, a tablet, a personal digital assistant (PDA), a smartphone, a laptop, a netbook, a tablet, a personal computer, a wireless sensor, consumer electronics, an internet of things (IoT) device, and the like.

Each of the base stations 114a, 114b may be any type of device configured to wirelessly interface with at least one of the WTRUs 102a, 102b, 102c, 102d to facilitate access to one or more communication networks, such as the core network 109, the Internet 110, and/or the networks 112. By way of example, the base stations 114a, 114b may be a base transceiver station (BTS), a Node-B, an eNode B, a Home Node B, a Home eNode B, a site controller, an access point (AP), a Personal Basic Service Set (PBSS) Control Point (PCP), a wireless router, and the like. While the base stations 114a, 114b are each depicted as a single element in FIG. 1B, the base stations 114a, 114b may include any number of interconnected base stations and/or network elements.

The base station 114a may be part of the RAN 105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115, which may be any suitable wireless communication link (e.g., radio frequency (RF), microwave, infrared (IR), ultraviolet (UV), visible light, etc.). The air interface 115 may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 105 and the WTRUs 102a, 102b, 102c may implement a radio technology such as Universal Mobile Telecommunications System (UMTS) Terrestrial Radio Access (UTRA), which may establish the air interface 115 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1B may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1B, the base station 114b may have a direct connection to the Internet 110. Thus, the base station 114b may not be required to access the Internet 110 via the core network 109.

The RAN 105 may be in communication with the core network 109, which may be any type of network configured to provide voice, data, applications, and/or voice over internet protocol (VoIP) services to one or more of the WTRUs 102a, 102b, 102c, 102d. For example, the core network 109 may provide call control, billing services, mobile location-based services, pre-paid calling, Internet connectivity, video distribution, etc., and/or perform high-level security functions, such as user authentication. Although not shown in FIG. 1B, it should be appreciated that the RAN 105 and/or the core network 109 may be in direct or indirect communication with other RANs (not shown) that employ the same RAT as the RAN 105 or a different RAT. For example, in addition to being connected to the RAN 105, which may be utilizing an E-UTRA radio technology, the core network 109 may also be in communication with another RAN (not shown) employing a GSM radio technology.

The core network 109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network (not shown) connected to one or more RANs (not shown), which may employ the same RAT as the RAN 105 or a different RAT.

Some or all of the WTRUs 102*a*, 102*b*, 102*c*, 102*d* in the communications system 100 may include multi-mode capabilities (i.e., the WTRUs 102*a*, 102*b*, 102*c*, 102*d* may include multiple transceivers for communicating with different wireless networks over different wireless links). For example, the WTRU 102*c* shown in FIG. 1B may be configured to communicate with the base station 114*a*, which may employ a cellular-based radio technology, and with the base station 114*b*, which may employ an 802.11 radio technology.

In one embodiment, the communications system 100 may have a wireless network with bearers that extend beyond the wireless network (e.g., beyond a "walled garden" associated with the wireless network) and that may be assigned QoS characteristics.

Additionally, the communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

Figure 1C:
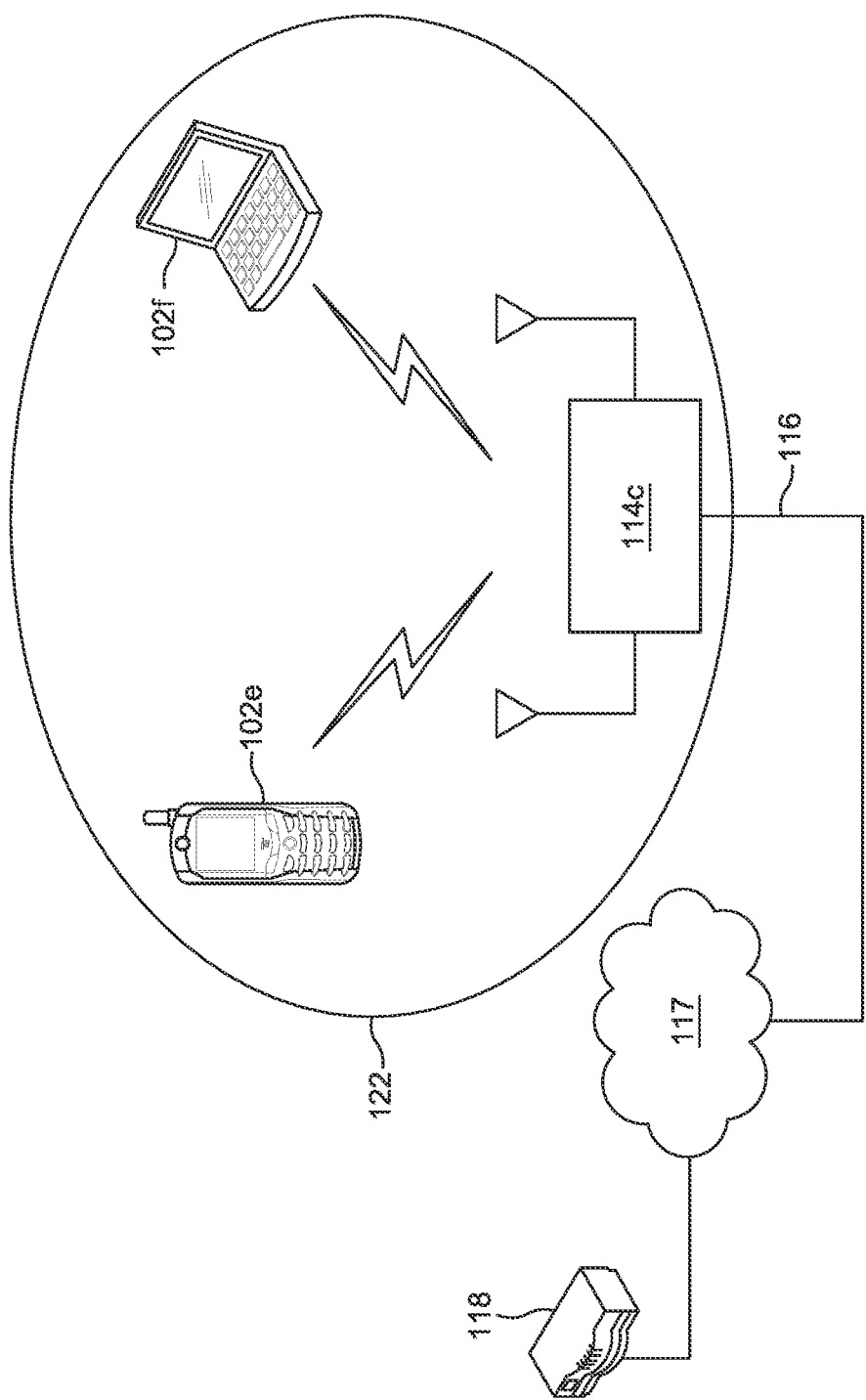
FIG. 1C is a system diagram of an example communications system.

FIG. 1C shows a diagram of an example wireless local area network (WLAN) 122. One or more of the devices of WLAN 122 may be used to implement one or more of the embodiments/features described herein. The WLAN 122 may include, but is not limited to, Access Point (AP/PCP) 114*c*, station (STA) 102*e*, and STA 102*f*. STA 102*e* and 102*f* may be associated with AP 114*c*. The WLAN 122 may be configured to implement one or more protocols of the IEEE 802.11 communication standard, which may include a channel access scheme, such as DSSS, OFDM, OFDMA, or the like. A WLAN 122 may operate in a mode, such as an infrastructure mode, an ad-hoc mode, or the like. A STA may be a wired or wireless device, the same or similar to a wireless transmit receive unit (WTRU) as described herein. In one example, a STA 102*e*, 102*f* is a wireless mobile device. An AP/PCP 114*c* may be a wired or wireless device, the same or similar to a WTRU as described herein. In one example, an AP 114*c* is a stationary device with both a wired and wireless interface.

A WLAN 122 operating in an infrastructure mode may comprise of one or more APs 114*c* communicating with one or more associated STAs 102*e* and 102*f*. An AP 114*c* and STA(s) 102*e* and 102*f* associated with the AP 114*c* may comprise a basic service set (BSS). For example, AP 114*c*, STA 102*e*, and STA 102*f* may comprise BSS WLAN 122. An extended service set (ESS) may comprise one or more APs, with one or more BSSs, and one or more STAs associated with the APs (not shown). An AP 114*c* may have access to, and/or interface with, a distribution system (DS) 116, which may be wired and/or wireless and may carry traffic to and/or from the AP 114*c*. Traffic to a STA 102*e* or 102*f* in the WLAN 122 originating from outside the WLAN 122 may be received at an AP 114*c* in the WLAN 122, which may send the traffic to one of the STA 102*e* in the WLAN 122. Traffic originating from a STA 102*e* in the WLAN 122 to a destination outside the WLAN 122 (e.g., to server 118) may be sent to an AP 114*c* in the WLAN 122, which may send the traffic to the destination (e.g., via DS 116) to network 117 to be sent to server 118. Traffic between STAs 102*e* and 102*f* within the WLAN 122 may be sent through one or more APs 114*c*. For example, a source STA 102*e* may have traffic intended for a destination STA 102*f*. STA 102*e* may send the traffic to AP 114*c*, and, AP 114*c* may send the traffic to STA 102*f*.

Alternatively, traffic between STAs 102*e* and 102*f* within a BSS WLAN 122 may be peer-to-peer traffic. Peer-to-peer traffic may be sent between the source and destination STAs with a direct link setup (DLS) using an 802.11e DLS or an 802.11z tunneled DLS (TDLS) and may be sent directly. A WLAN 122 may use an Independent BSS (IBSS) mode and may have no AP/PCP, and/or STAs, and may communicate directly with another WLAN (not shown). This mode of communication may be referred to as an "ad-hoc" mode of communication. In an ad-hoc mode WLAN 122, the STAs 102*e* and 102*f* may communicate directly with each other without the communication being routed through an AP 114*c*.

Devices may operate using IEEE 802.11 protocols, such as the AP/PCP 103 may use the 802.11ac infrastructure mode of operation. The AP/PCP 114*c* may transmit a beacon and may do so on a fixed channel. The fixed channel may be the primary channel. The channel may be 20 MHz wide and may be the operating channel of the BSS. The channel may be used by the STAs 102*e* and 102*f* and may be used to establish a connection with the AP/PCP 114*c*.

STA(s) and/or AP(s) may use a Carrier Sense Multiple Access with Collision Avoidance (CSMA/CA) channel access mechanism. In CSMA/CA a STA and/or an AP may sense the primary channel. In one example, if a STA has data to send, the STA may sense the primary channel and if the primary channel is detected to be busy, the STA may back off. In another example, a WLAN or portion thereof may be configured so that one STA may transmit at a given time (e.g., in a given BSS). Channel access may include Request to Send (RTS) and/or Clear to Send (CTS) signaling. In another example, an exchange of a RTS frame may be transmitted by a sending device and a response may be a CTS frame sent by a receiving device. In another example, if an AP has data to send to a STA, the AP may send an RTS frame to the STA. If the STA is ready to receive data, the STA may respond with a CTS frame. The CTS frame may include a time value that may alert other STAs to hold off from accessing the medium/channel while the AP initiating the RTS may transmit its data. Once the CTS frame is received from the STA, the AP may send the data to the STA.

A device may reserve spectrum via a network allocation vector (NAV) field. For example, in an IEEE 802.11 frame, the NAV field may be used to reserve a channel for a time period. A STA that wants to transmit data may set the NAV to the time for which it may expect to use the channel. When a STA sets the NAV, the NAV may be set for an associated WLAN or subset thereof (e.g., a BSS). Other STAs may count down the NAV to zero. When the counter reaches a value of zero, the NAV functionality may indicate to the other STA that the channel is now available.

802.11ad may contain amendments that specify the MAC and PHY layers for very high throughput (VHT) in the 60 GHz band. 802.11ad may support data rates up to 7 Gbits/s. 802.11ad may support three different modulation modes (e.g., control PHY with single carrier and spread spectrum, single carrier PHY, and OFDM PHY). 802.11ad may use a 60 GHz unlicensed band and/or a band that is available globally. At 60 GHz, the wavelength is 5 mm, and compact antennas or antenna arrays may be used. An antenna may create narrow RF beams (e.g., at both transmitter and receiver). The narrow RF beams may effectively increase the coverage range and may reduce the interference.

Figure 2:
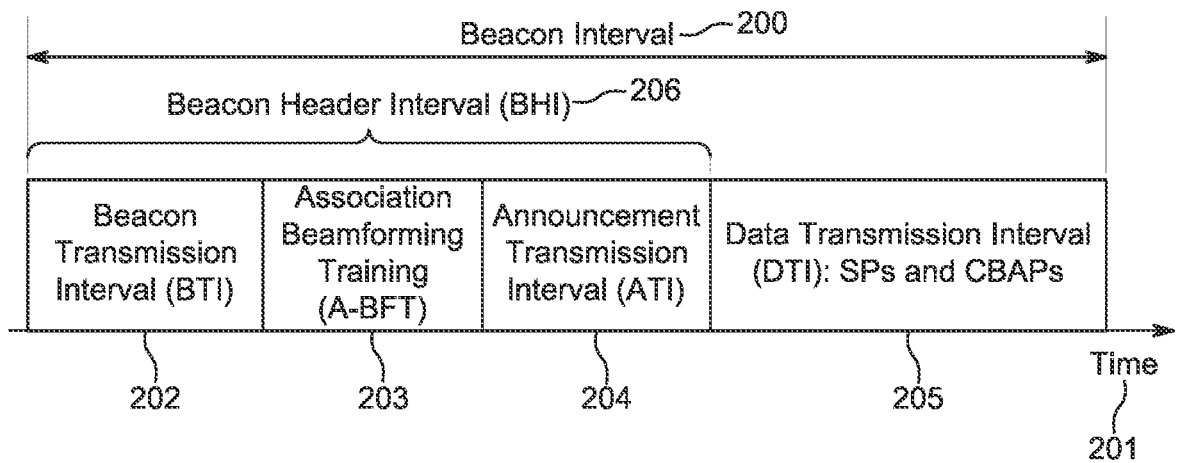
FIG. 2 is an example of IEEE 802.11ad beacon interval.

FIG. 2 is a diagram of an example Beacon Interval (BI) for an 802.11 standard, such as 802.11ad. On the horizontal axis time 201 is shown. A BI 200 may last a period of time and may include one or more (e.g., three) intervals including Beacon Transmission Interval (BTI) 202, Association Beamforming Training (A-BFT) 203, Announcement Transmission Interval (ATI) 204, and/or Data Transmission Interval (DTI) 205. The BTI 202, A-BFT 203, and/or ATI 204 may be included in a beacon header interval (BHI) 206.

The BTI 202 may include multiple beacon frames. A beacon frame may be transmitted by the PCP/AP on a different sector to cover some or all possible directions. The frame may be used for network announcement and/or beamforming training of the PCP/AP's antenna sectors. A-BFT 203 may be used by STAs to train the STAs' antenna sectors for communication with a PCP/AP. In the ATI 204, the PCP/AP may exchange management information with associated and/or beam-trained STAs. The DTI 205 may include one or more contention-based access periods (CBAPs) and/or scheduled service periods (SPs) where stations exchange data frames. In CBAP, multiple STAs may contend for a channel according to an 802.11 enhanced distributed coordination function (EDCF). In an SP, a dedicated pair of nodes may be assigned for communication between during a contention free period.

Figure 3:
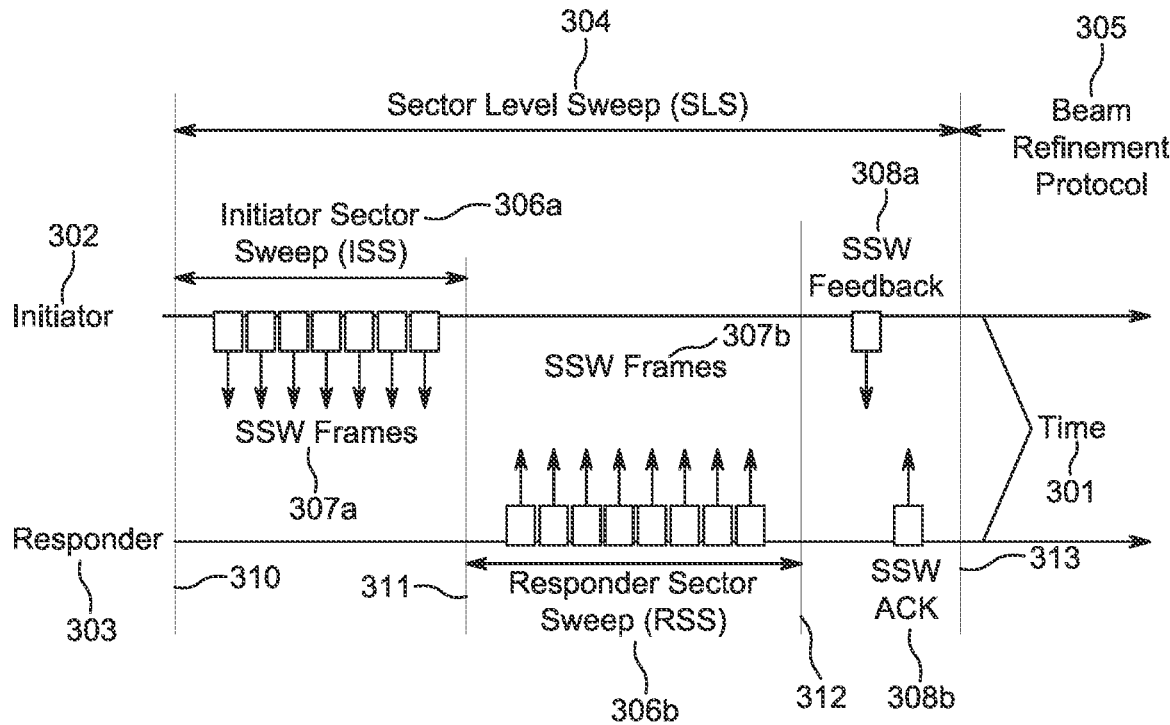
FIG. 3 is an example of sector level sweep (SLS) training.

FIG. 3 is a diagram of an example beamforming training, such as a Sector Level Sweep (SLS). The frame structure of 802.11ad may facilitate a mehanism for beamforming training (e.g., discovery and tracking). The beamforming training protocol may comprise two components: SLS 304 and a Beam Refinement Protocol (BRP) 305. The SLS 304 may be used for transmitting beamforming training. The BRP 305 may enable receiving beamforming training and/or may refine (e.g., iteratively) the transmit and/or receive beams. For any beamforming training there may be an initiator 302 and a responder 305. Transmission back and forth between the initiator 302 and the responder 303 is shown in the vertical axis, and time 301 is shown in the horizontal axis. In one example of SLS 304, the initiator 302 may send an Initiator Sector Sweep (ISS) 306a to the responder 303 in one or more Sector Sweep (SSW) Frames 307a. After, the responder 303 may send a Responder Sector Sweep (RSS) 306b in one or more SSW Frames 307b. Once the initiator 302 receives SSW Frames 307b from the RSS 306b, it may then send SSW Feedback 308a. The responder 303 may send an SSW Acknowledgement (ACK) 308b in return. One or more steps of this process may be repeated. Afterwards, BRP 305 may be performed.

SLS 304 training may use a beacon frame or a SSW frame. When the beacon frame is utilized, the AP/PCP may repeat the beacon frame with multiple beams/sectors within each BI, and/or multiple STAs may perform BF training (e.g., simultaneously). The AP/PCP may not be able to sweep all the sectors/beams within one BI (e.g., due to the size of the beacon frame). A STA may wait one or more BIs to complete an ISS training. Latency may also be a consideration. When a SSW frame is utilized (e.g., for point to point BF training), an SSW frame may be transmitted (e.g., using control PHY) using the SSW frame format shown in FIG. 4.

Figure 4:
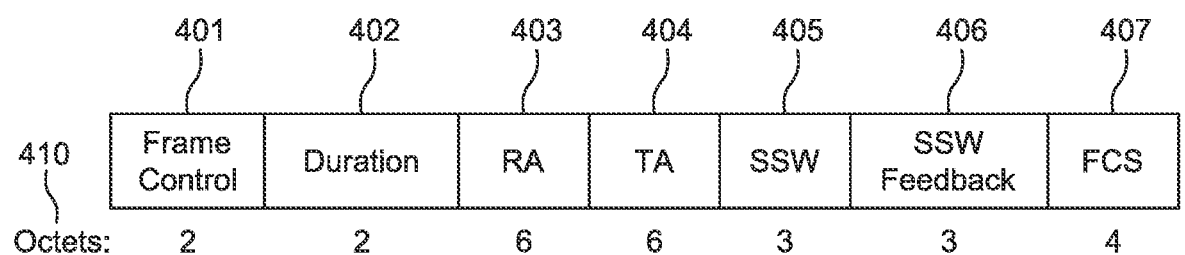
FIG. 4 is an example format for a sector sweep (SSW) frame.

FIG. 4 is a diagram of an example frame format for a selection SSW frame. Octets 410 are labeled on the horizontal axis. The format may include Frame Control 401 at octet 2, Duration 402 at octet 2, Receiver Address (RA) 403 at octet 6, 404 Transmitter Address (TA) at octet 6, SSW 405 at octet 3, SSW Feedback 406 at octet 3, and Frame Check Sequence (FCS) 407 at octet 4.

Figure 5:
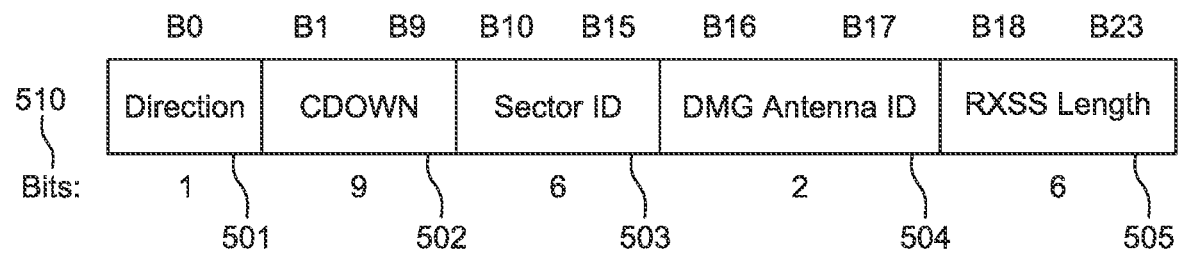
FIG. 5 is an example format for an SSW field in an SSW frame.

FIG. 5 is diagram of an example format for an SSW field in an SSW frame. Bits 510 are labeled in number of bits per element underneath on the horizontal axis and the bit identifier(s) is correspondingly labeled above on the horizontal axis. The elements may include Direction 501 comprising of 1 bit, Count Down (CDOWN) 502 comprising of 9 bits, Sector ID 503 comprising of 6 bits, Directional Multi-Gigabit (DMG) Antenna ID 504 comprising of 2 bits, and Receive Sector Sweep (RXSS) 505 length comprising of 6 bits. For example, Sector ID 503 is 6 bits in length and may occupy bit location B10 through B15.

FIG. 6A is diagram of an example format for an ISS field in an SSW frame. Bits 610 are labeled in number of bits per element underneath on the bottom of the horizontal axis and the bit identifier(s) is correspondingly labeled above on the horizontal axis. The elements may include Total Sectors 601 in ISS comprising of 9 bits, Number of RX-DMG antennas 602 comprising of 2 bits, a Reserved field 603 comprising of 5 bits, Poll Required 604 comprising of 1 bit, and another Reserved field 605 comprising of 7 bits.

FIG. 6B is a diagram of an example format of an RXSS field in an SSW frame. Bits 630 are labeled in number of bits per element underneath on the horizontal axis and the bit identifier(s) is correspondingly labeled above on the horizontal axis. The elements may include Sector Select 621 comprising 6 bits, DMG Antenna Select 622 comprising of 2 bits, Signal to Nose Ratio (SNR) report 623 comprising of 8 bits, Poll Required 624 comprising of 1 bit, and a Reserved field 625 comprising of 7 bits.

Figure 7:
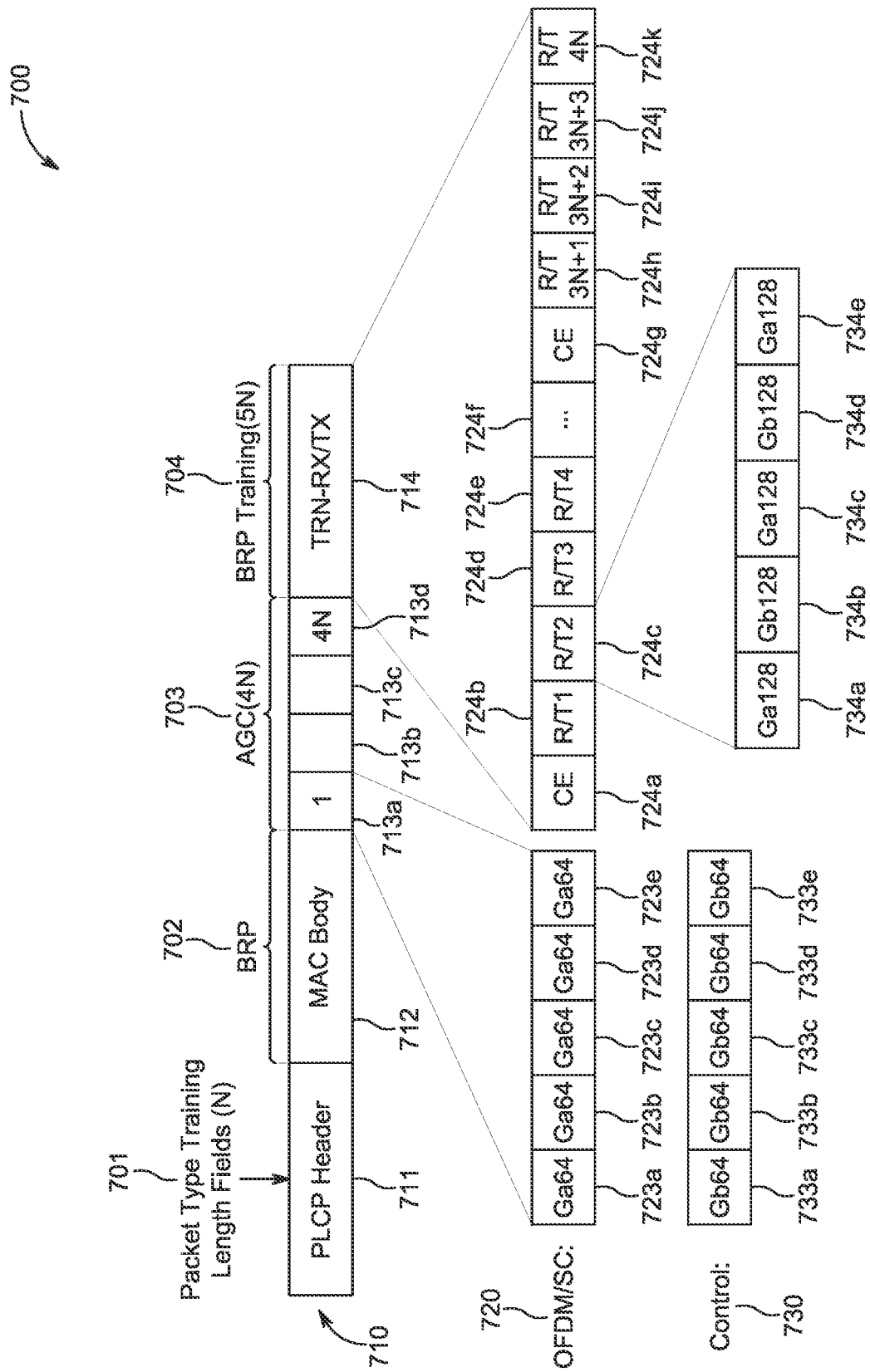
FIG. 7 is an example physical layer convergence procedure (PLCP) Protocol Data Unit (PPDU) carrying a beam refinement protocol (BRP) frame and training (TRN) fields.

FIG. 7 is a diagram of an example of a Protocol Data Unit (PPDU) 710 that may be used for a Physical Layer Convergence Procedure (PLCP). The PDDU 710 may have several frames/fields, such as a Packet Type Training Length (PTTL) fields 701 of training length (N), a beam refinement protocol (BRP) frame 702, an Automatic Gain Control (AGC) field 703 of training length (4N), and BRP training fields 704 of training length (5N). The AGC 703 may be considered to be a part training fields. The value (N) may be the training length (e.g., training length that may be given in the header filed). The training length may indicate that the AGC 703 is 4N (i.e., 4 times N training lengths) subfields and may indicate that the TRN-RX/TX field is 5N subfields. In one implementation, the PTTL 701 may be a PLCP header 711, the BRP 702 may be a Medium Access Control (MAC) body 712, the AGC 703 may comprise four fields 713a-d, and the BRP training fields 704 may be a series of training (TRN) fields 714. Each AGC field 703 may be transmitted by a Single Carrier (SC) Orthogonal Frequency Division Multiplexing (OFDM) waveform and may be comprised of multiple Golay complementary sequences of length 64 Ga64 723a-c, each with a corresponding control 730 sequences of Gb64 733a-e. Also, the TRN-RX/TX 714 may be carried by a number of SC-OFDM waveform comprised of subfields 7241a-k. For example, the CE 724a subfield may be the same as or similar to the one in a preamble and may repeat for five training lengths (5N), where 724a would be the first and 724g would be the fifth. Subfields (e.g., all subfields) in the training fields of PPDU b 710 may be transmitted using rotated Tr/2-BPSK modulation. Each subfield of the TRN-RX/TX 714, such as R/T2 724c, may be comprised of control Golay complementary sequences of length 128 alternating between Ga128 and Gb128 734*a-e*.

As discussed herein, BRP may be a process where a STA improves its antenna configuration (or antenna weight vectors), such as for transmission and/or reception. In such a process, BRP training packets may be used to train the receiver and/or transmitter antenna. There are two types of BRP packets: BRP-RX, such as TRN-RX 714 (e.g., beamforming refinement protocol receiver) packets, and BRP-TX, such as TRN-TX 714 (e.g. beamforming refinement protocol transmitter) packets. A BRP packet may be carried by a DMG PPDU and may be followed by an AGC field. The AGC field may be followed by a TX or RX TRN field, for example, as shown in FIG. 7.

A BRP 702 MAC body 712 frame may be an Action No. ACK frame and may have one or more of the following fields: Category, Unprotected DMG Action, Dialog Token, BRP Request field, DMG Beam Refinement element, Channel Measurement Feedback element 1 to Channel Measurement Feedback element k.

The 802.11ay physical layer (PHY) and the IEEE 802.11ay MAC layer and may have at least one mode of operation capable of supporting a maximum throughput of at least 20 gigabits per second, measured at the MAC data service access point, and may maintain or improve the power efficiency (e.g., per station). The 802.11ay PHY and the MAC layer may have license-exempt bands above 45 GHz that may have backward compatibility and/or may coexist with DMG STAs (e.g., legacy) operating in the same band. 802.11ay may operate in the same band as legacy standards. There may be backward compatibility and/or coexistence with legacies in the same band. 802.11ay may support one or more of the following: multiple input, multiple output (MIMO) transmission (e.g., single-user (SU)-MIMO and/or multi-user (MU)-MIMO) and/or multi-channel transmission including channel bonding and/or channel aggregation.

In one embodiment, the TRN-RX/TX field may be appended to a DMG beacon frame, and Enhanced DMG (EDMG) STAs may be allowed to perform RX/TX training using beacon frames. This may be implemented in an enhanced SLS process.

Figure 8:
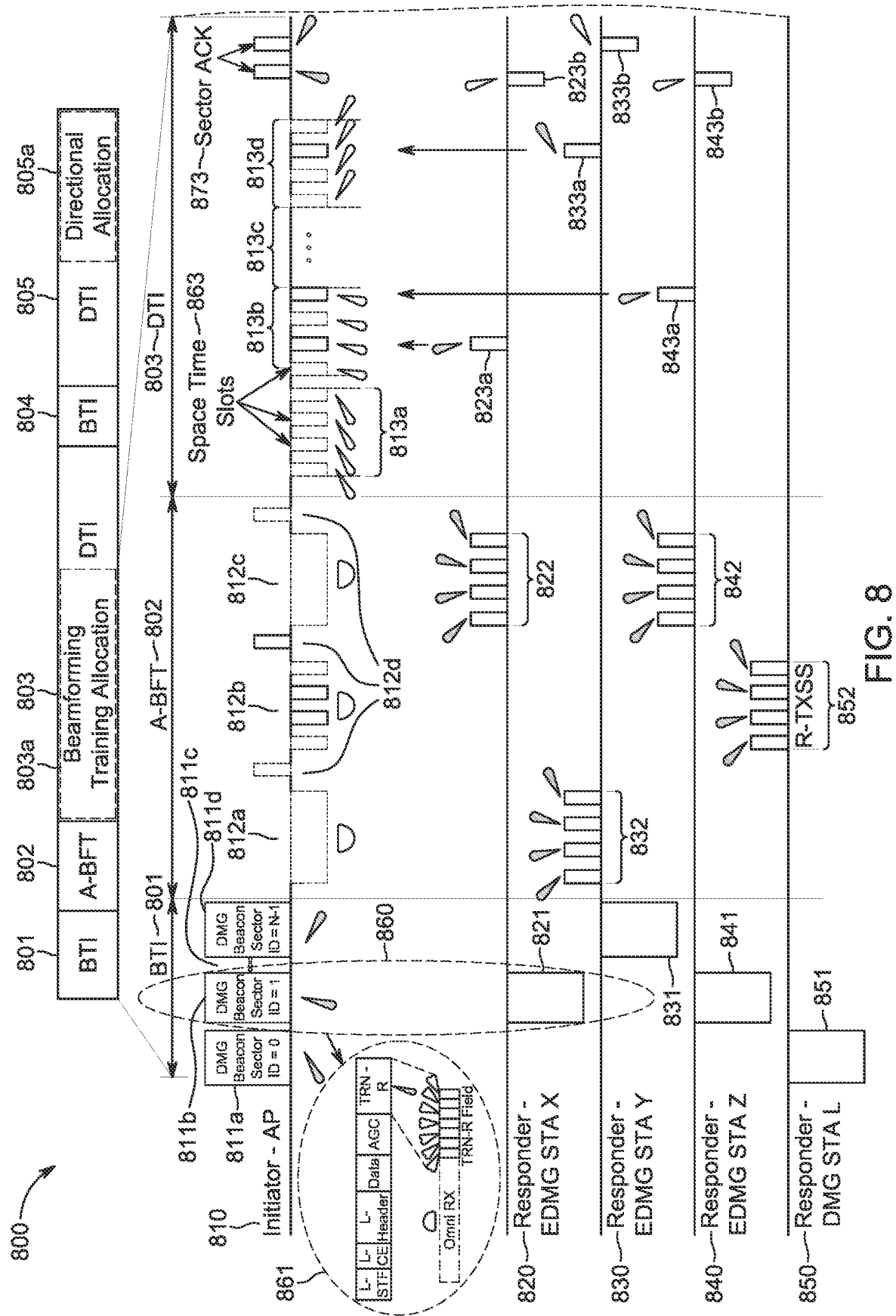
FIG. 8 is an example of enhanced SLS implementation.

FIG. 8 is a diagram of an example enhanced SLS implementation. For a given beacon interval 800, there may be a beacon transmission interval (BTI) 801, association beamforming training (A-BFT) 802, and/or data transmission interval (DTI) 803 just as in FIG. 2. Enhanced SLS, however, may have Beamforming Training Allocation (BTA) 803*a* may be used in DTI 803. BTA 803*a* may be scheduled using EDMG extended schedule element.

As discussed herein, during the initial BTI 801 an initiator AP 801 may have a number of sector training beams 811*a*-811*d*, each with a unique direction, such as that indicated by the tear drop beneath each sector training beam 811*a*-811*d* in FIG. 8. The portions shown in 860 and 861 are discussed in further detail with regard to FIG. 10 and FIG. 11.

In an allocation, an Initiator AP/PCP 810 may repeat the sector sweep in the same order as in the BTI 801 (e.g., in the Rx mode) for the BTA 803*a*. Responder EDMG STAs X 820, Y 830, Z 840, and/or STA DMG L 850 may receive in a sector which corresponds to a specific sector (e.g., best sector) during BTI 801 transmit sector sweep (TXSS), such as 821, 831, 841, and/or 851, respectively. A sector ACK frame, not shown, may be transmitted from the AP/PCP 810. Through this enhanced SLS, directional allocation may be introduced to the DTI, and the AP/PCP's receive sector may be specified and/or used to listen during the allocation.

The transmit sectors/beams may have been trained during a BTI 801 TXSS. A responder STA 820, 830, and 840 may receive sectors/beams that have been trained using a TRN-RX field. The TRN-RX field may be appended to the beacon frame during the BTI 801 TXSS. One or more of the following aspects may remain in a responding sub-phase of BTA 803*a*: a collision may happen in the BTA 803*a*, and/or collision resolution may be used; a modified responding approach that incorporates a possibility of multiple channels for feedback may be used (e.g., with multi-channel transmission); and or, STAs that are not associated with the AP/PCP 810 may transmit in the BTA 803*a*. As a result of the enhanced SLS, pre-association transmission may be performed.

A-BFT 802 the AP/PCP 810 may transmit in a series of transmit sectors 812*a*, 812*b*, and 812*c*, interspersed with receive sectors 812*d*. The transmissions may include omni-directional transmissions, for example as indicated by the semi-circle above 812*a*, 812*b*, and 812*c*. The STAs 820, 830, 840, and 850 may response with a R-TXSS 822, 832, 842, and 852, respectively.

Figure 9:
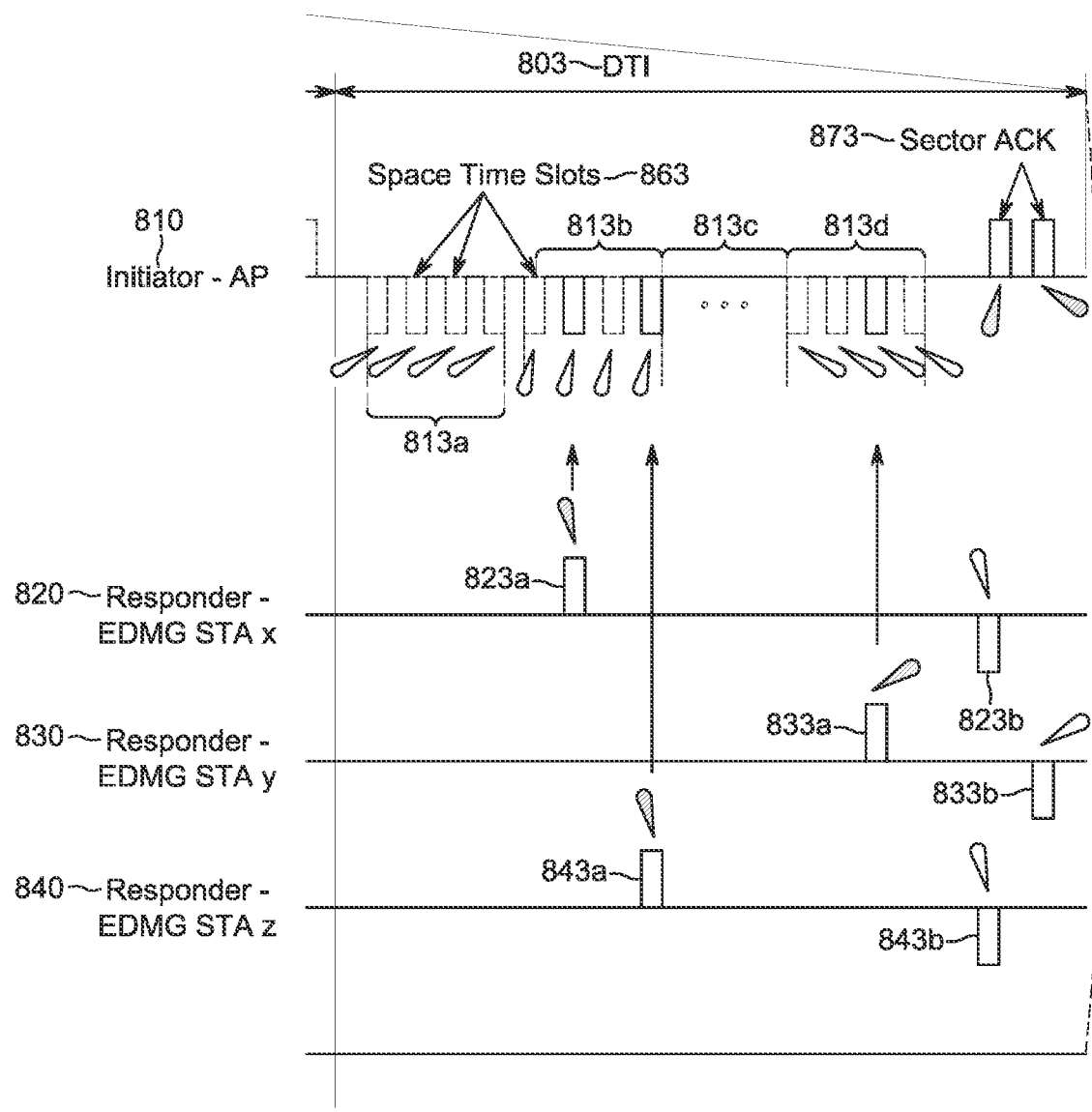
FIG. 9 illustrates an example of a baseline responding implementation.

FIG. 9 shows a diagram focusing on the DTI 803 portion on the right side of FIG. 8. FIG. 9 is similar to FIG. 8 in so far as elements are similarly numbered. FIG. 9 differs, however, in showing an example of a baseline responding implementation in BTA 803*a*. A responding frame, such as 823*a*, 833*a*, and 843*a*, may be transmitted by a responding STA 820, 830, and 840, respectively, in an initiator's 810 sector detected (e.g., as the best one) during a previous BTI 801 TXSS.

The PCP/AP 810 may repeat a sector sweep in the same order as the sector sweep in the BTI 801 (e.g., in the RX mode). The PCP/AP 810 may repeat a (e.g., each) sector one or more times in a Space Time Slot (STS) 863. The STSs of solid lines are meant to demonstrate communication for an associated STA and STSs of dotted lines are meant to demonstrate communication for unassociated STAs. In one example, the BTA 803*a* may include one or more sub-phases 813*a*-813*d*. The sub-phases 813*a*-813*d* may include a responding sub-phase 823*a*, 833*a*, and 843*a*. In the responding sub-phases 823*a*, 833*a*, and 843*a*, STAs 820, 833, and 843, respectively, may transmit a response to the AP/PCP 810. For example, in sub-phase 813*b* the AP 810 may keep its receive beam constant over the 4 STSs. STA 820 selects the 2nd STS of sub-phase 813*b* and transmits 823*a* while STA 840 selects STS 4 of sub-phase 813*b* and transmits 843*a*. In sub-phase 813*d* the AP 810 keeps its receive beam constant over the 4 STSs. STA 830 selects the 3rd STS of 813*d* and transmits 833*a*.

For each responding sub-phase 823*a*, 833*a*, and 843*a*, there may be an acknowledgement (ACK) sub-phases. For example, the AP 810 may send a Sector ACK 873 on each STS and STA 820, 830 and 840 receive the sector ACKs on 823*b*, 833*b* and 843*b*. Alternatively, a sector ACK frame may be transmitted from an AP/PCP in each sector following a sector sweep. As discussed herein, a sector and sub-phase may be used interchangeably.

FIG. 10 is a diagram of an example signal configuration of a DMG beacon frame showing, amongst other elements, the STS length. In one embodiment, the signal 1000 may begin with a Legacy Short Training Field (L-STF) 1001, followed by a Legacy Channel Estimation Field (L-CEF) 1002, followed by a Legacy Header (L-Header) 1003, followed by Data 1004, followed by the number of STS 1005, followed by the AGC 1006, and followed by TRN-RX 1007. The aforementioned order may be re-arranged as needed and is only an example of one configuration. The number of STSs 1005 for a sector may be equal or unequal. The number of STSs 1005 for a sector may be fixed or negotiable. An STS configuration (e.g., whether the STS configuration for a sector is unequal and/or negotiable) may be transmitted in an EDMG beacon frame corresponding to a sector.

FIG. 11 shows a diagram focusing on elements 860 and 861 from the left portion of FIG. 8. FIG. 11 is similar to FIG. 8 in so far as elements are similarly numbered. FIG. 11 differs, however, in showing the detail of elements 860 and 861. Initiator EDMG AP 810 may undergo BTI with DMG beacon sectors of 811a, 811b, 811c, and 811d. Circle 860 highlights where a DMG beacon sector 821 was received at a responder EDMG STA x 820 from initiator DMG beacon 811b. The DMG beacon interval 811b with a sector ID=1 may have an example signal configuration 1000 shown in the dotted circle 860. The signal configuration 1000 of the DMG beacon is the same as the signal configuration discussed in general terms related to FIG. 10. The number of STSs in the signal configuration 1000 may be associated with the ID, which is equal to 1 based on the sector ID=1 shown in DMG beacon 811b. Also in the example shown in 861, the TRN-RX 1007 may be further comprised of one or more TRN-R including Golay complementary sequences 1007a-d and may be preceded by an Omni-RX 1008.

Figure 12:
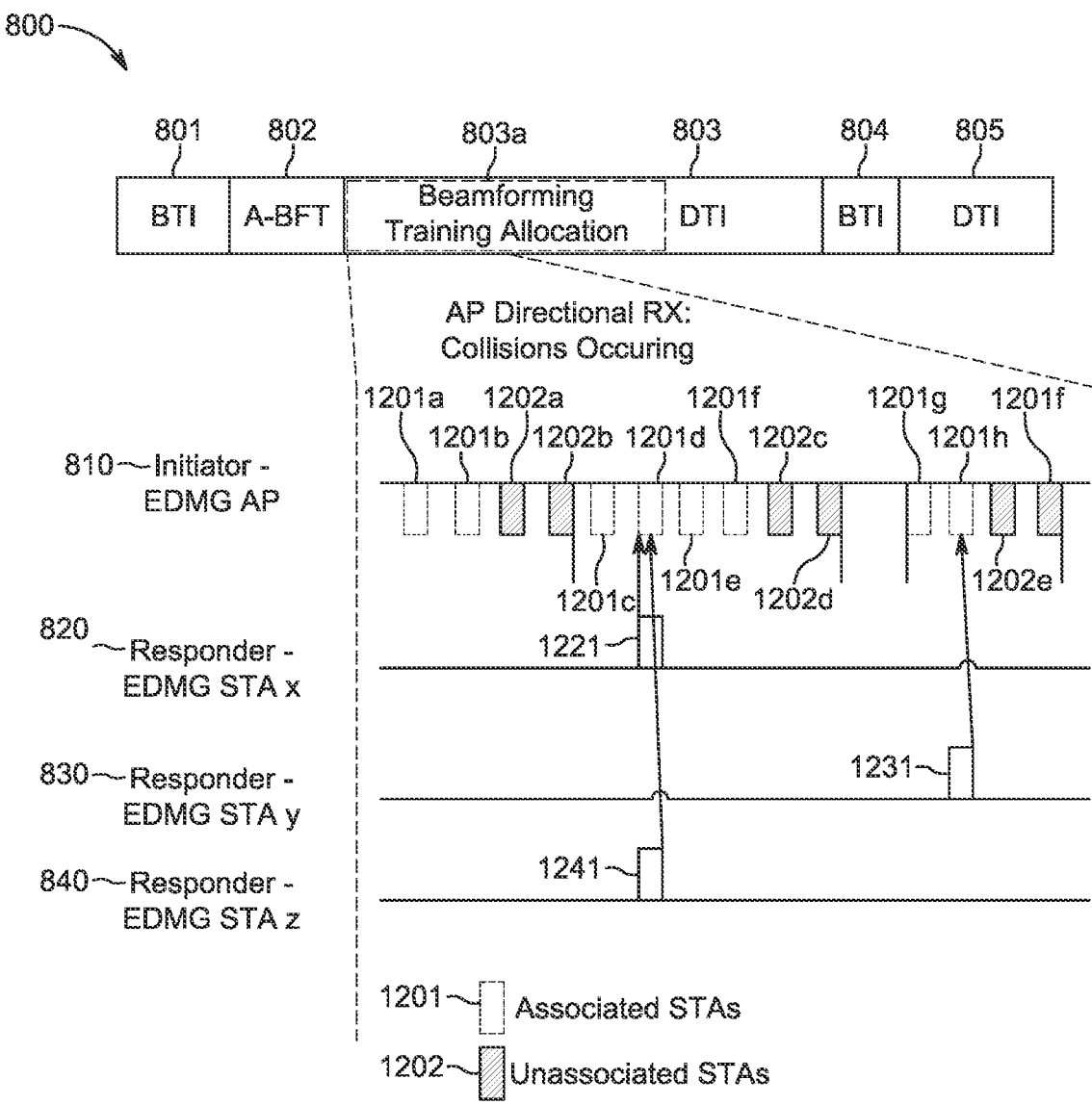
FIG. 12 illustrates an example of varying the number of STS in a beam in access point (AP) directional Rx interval.

FIG. 12 shows a diagram of an example situation where during BTA 803a there may be collisions in the responses for directional reception at an initiator. FIG. 12 is similar to FIG. 8 in so far as elements are similarly numbered. FIG. 12 differs, however, in showing a collision scenario. The dotted blocks shown in white, such as 1201a-1201h, represent associated STA responses 1201 sent to the initiator EDMG AP 810. The blocks shown in black, such as 1202a-202f, represent unassociated STA responses 1202. In one or more embodiments, the number of STSs may differ from sector to sector (e.g., unequal) and/or may be negotiable. The number of STSs for a sector may need to be changed or adapted, such as when there is a collision during an STA response interval. For example, 1241 response from responder EDMG STA z 840 may collide with response 1221 from responder EDMG STA x 820. FIG. 12 illustrates an example of varying the number of STS in a beam in an AP directional Rx interval.

In one or more embodiments, the number of STSs for a given increment (e.g., for a sector) may be equal and/or set by the specification. In one or more embodiments, the number of STSs for (e.g., each) sector(s) may be equal and/or negotiable (e.g., between a PCP/AP and STAs). The PCP/AP may modify the number of STSs (e.g., for a sector), for example, based on the presence or absence of collisions (like the example of FIG. 12). The PCP/AP may modify the number of STS to ensure that a minimum number of STSs are used and/or avoid unnecessary overhead. The number of STS for a beam may be signaled in the beacon in a field (e.g., a number STS field).

Figure 13:
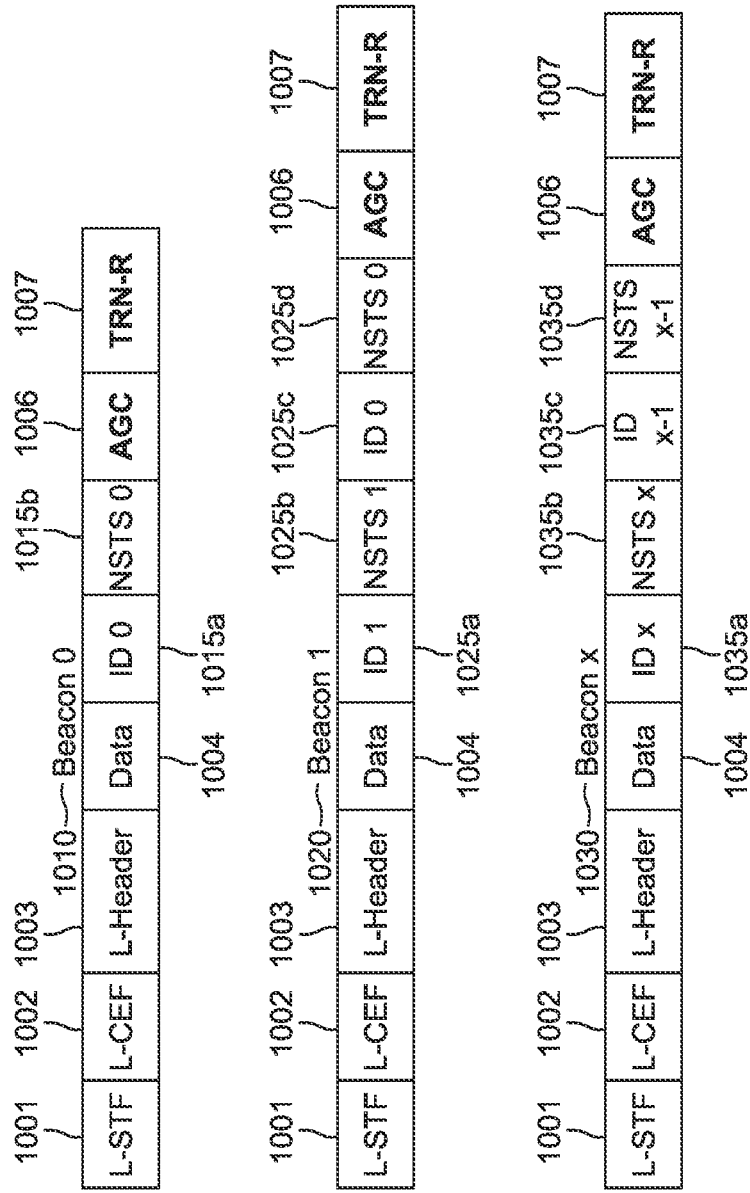
FIG. 13 illustrates an example of beacon with variable size; information for x beams may be signaled.

FIG. 13 is several examples of a signal configuration based on the underlying design of the example shown in FIG. 10, where the number of STS varies in size. FIG. 13 is similar to FIG. 10 in so far as elements are similarly numbered. FIG. 13 differs, however, in showing information for x beams (e.g., only for x beams) may be signaled within the STS field(s). In one or more embodiments, a current beam index and/or a list of beam indices for STSs (e.g., previous STSs) with a corresponding number of STSs, may be signaled in a (e.g., each) beacon. For example, in Beacon 0 1010, there may be an initial STS number field for the session ID 0 1015a followed by the number of STS (NSTS) 0 1015b. Similarly, for Beacon 1, there may be a session ID 1 field 1025a followed by corresponding NSTS 1 field 1025b, and a session ID 0 field 1025c followed by a NSTS 0 field 1025d. As can be seen, this follows a pattern, where for Beacon x 1030, where x is any number, there may be an ID x field 1035a followed by an NSTS x field 1035b, and then an ID x−1 field 1035c followed by an NSTS x−1 field 1035d, continuing as necessary until zero fields are reached. Using this system, a receiving STA may be able to estimate when the STSs may compete as scheduled in a given beacon.

Table 1 and Table 2 show an example of signaling parameters. For instance, looking at Table 1, a slot group with slot ID 2 may start 9 slots after the start of the interval and/or may be valid for 4 slots. The entire table, a part of the table, and/or the some or all rows of the table (e.g., before a desired beam) may be signaled. The size of the beacon frame may change from beam to beam. For Table 1 and/or Table 2, it may be assumed that beam x and/or information for the x−1 STSs may be signaled in an N-beam enhanced SLS. A slot group ID of the slot (e.g., current slot) may be signaled (e.g., first), for example, to simplify decoding. The decoder may be enabled to (e.g., implicitly) estimate a start of the AGC field.

TABLE 1

Example Signaling with Slot ID and number of STSs

| Slot ID | NSTS slot |
|---|---|
| 0 | 3 |
| 1 | 6 |
| 2 | 4 |
| 3 | 2 |
| 4 | 1 |

Figure 14:
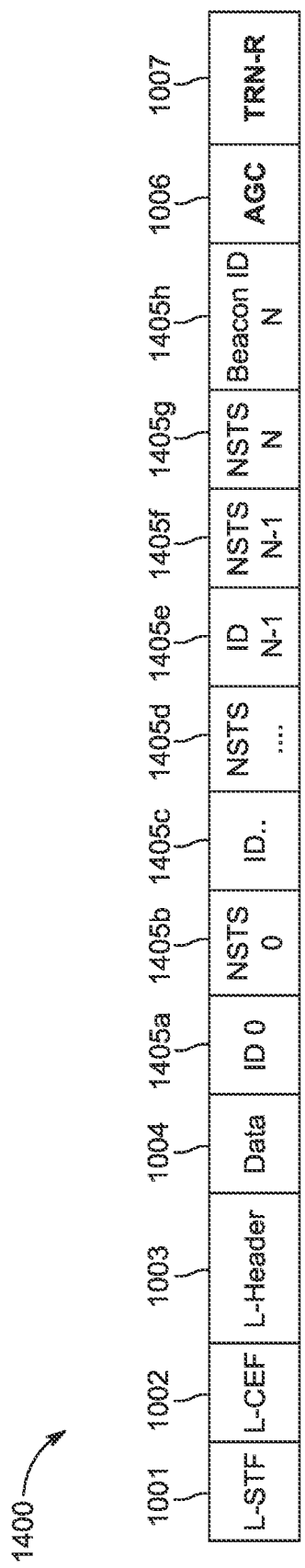
FIG. 14 illustrates an example of fixed beacon size; information for some or all N beam may be signaled.

FIG. 14 is a signal diagram showing an example where a beacon is a fixed size. FIG. 14 is similar to FIG. 10 in so far as elements are similarly numbered. FIG. 14 differs, however, in showing one embodiment concerning signaling design, where the size of the beacon frame may be kept constant (e.g., by signaling information for some or all N beams). Information for some or all N beam(s) may be signaled. The size of the beacon frame may be kept constant by signaling information to allow the STA to estimate (e.g., implicitly estimate) the start of the STSs corresponding to the sector associated with the beacon frame. In the example shown in FIG. 14, the STS fields may start with an ID 0 field 1405a followed by an NSTS 0 field 1405c, and these sets of an ID field and an NSTS field may repeat as indicated by fields 1405c and 1405d, respectively, until an N−1 repetition is reached indicated by 1405e and 1405f. The STS fields may eventually culminate in an NSTS N field and a Beacon ID N field, where N is the number of the specific beacon.

Table 2 presents example parameters for the embodiment where the size of the beacon frame may be kept constant as well as an STS start index. A row entry (e.g., a single row entry) of Table 2 may be signaled. The STS start index for a beam (e.g., a specific beam) and/or the number of STSs available for the beam may be signaled in a (e.g., each) beacon. Signaling the STS start index for a beam (e.g., a specific beam) and/or the number of STSs available for the beam may enable the STA to estimate when the STSs for which the STA desires to compete are scheduled.

TABLE 2

Example Signaling with Slot ID, number
of STS, and STS start index

| Slot ID | NSTS slot | STS Start Index |
|---------|-----------|-----------------|
| 0 | 3 | 0 |
| 1 | 6 | 3 |
| 2 | 4 | 9 |
| 3 | 2 | 13 |
| 4 | 1 | 15 |

Figure 15:
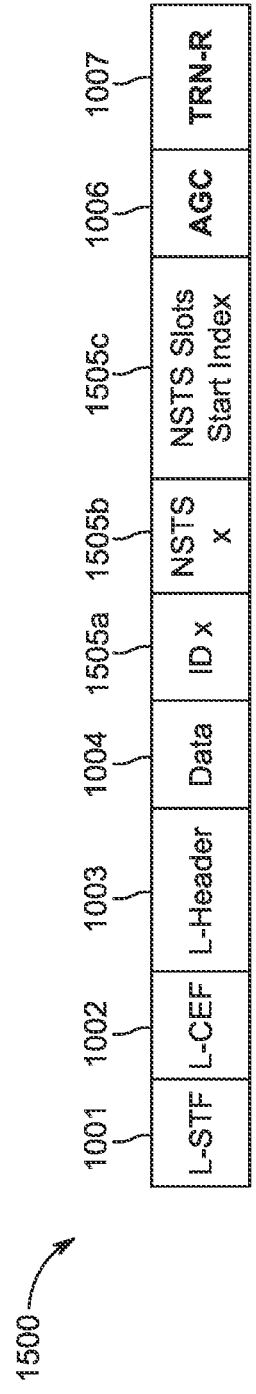
FIG. 15 illustrates an example of beacon with a fixed beacon size indicating the number of slots to wait before access.

FIG. 15 shows a signaling diagram of an example configuration with fixed beacon size indicating the number of slots to wait before access with the NSTS slots start index. The fields for the beacon 1500 may be similar to that of FIG. 10 using like numbers to indicate similar fields, but may differ in the STS fields. Specifically, FIG. 15 includes an ID x 1505a field, an NSTS x field, and the NSTS slots start index field 1505c, where x is the specific beacon.

In one embodiment, when a STA accesses an STS, there may not be time for channel assessment (e.g., clear channel assessment) before transmission. Therefore, there may be a need for a transmission protocol for the STA that differs from legacy CSMA/CA in 802.11. Specifically, when a STA accesses an STS it may use a modified random access procedure based on an indication of the number of STS resources available.

In one implementation, the modified random access procedure may begin with the PCP/AP indicating the number of STS resources available and/or an estimate of the number of STAs that may be transmitting (CW). An (e.g., each) STA may generate a number (e.g., a random number) between 1 and CW (or 0 and CW-1). If the generated number is less than or equal to the number of STS resources available ($N_{res}$), the STA may access the resources (e.g., specific resource). If the generated number is less than the number of STS resources available, the STA may randomly access the resources (e.g., any of the resources). If the number is greater than the number of STS resources available, the STA may subtract the number of STA resources from the generated number. The STA may wait for the next PCP/AP directional RX and/or access the resources (e.g., specific resource) or a random resource. The STA may send a signal to the PCP/AP to indicate that the STA is waiting.

In another implementation, an (e.g., each) STA may generate a random number between $N_{res}$ and CW, then follow the remaining steps as described with the random access procedure above.

In another implementation, an STA may perform a modified random access procedure and decide to access an STS(s) based on a hash function or some other function. The STS number N for sector number M for a STA, denoted by N(M)), may be a function or a hash function of one or more of the following parameters: association identifier (AID), MAC address or other IDs of the STA (e.g., depending whether a STA has associated with the PCP/AP or not), timing synchronization function (TSF) timer, the sector number M, the number of space time slots available ($N_{available}$), and/or the number of space time slots available for sector M ($N_{available}(M)$). For example, N(M)=f(AIDs, MAC Address, TSF timer, M, $N_{available}$, $N_{available}(M)$) or N(M)=hash(AID, MAC address, TSF timer, M, $N_{available}$, $N_{available}(M)$).

If one or more channels are available for transmitting BTA, an STA may choose the STS(s) in one or more of the channels available. For example, the STA may decide to use the STS(s) in a (e.g., the STA's most preferred) channel. The channel number on which the STA provides feedback may be a function of one or more of the following parameters: AID, MAC address or other IDs of the STA (e.g., depending whether a STA has associated with the PCP/AP or not), TSF timer, and the sector number M, the number of STSs available $N_{available}$, the number of STSs available for sector M $N_{available}(M)$, number of available channels $Num_{Channel\_available}$, number of channels available for sector M, and/or $Num_{Channel\_avalable}(M)$.

In one embodiment, a signal transmitted may not be STA specific. For example, a signal may be energy detected. The signal may inform the PCP/AP that a STA did not receive an acknowledgement of the STA's transmission.

Figure 16:
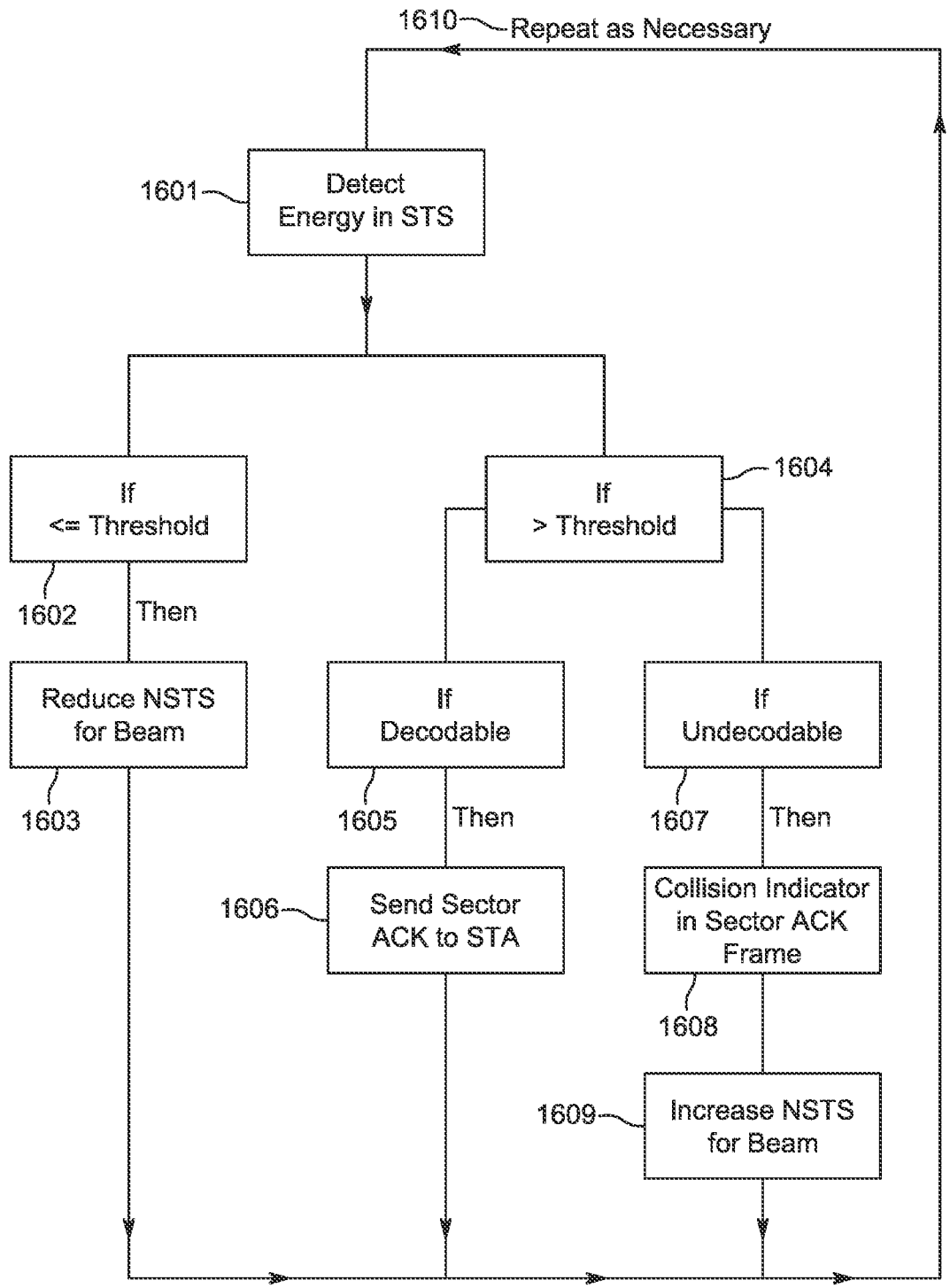
FIG. 16 illustrates an example of collision identification within access point (AP) directional receive interval.

FIG. 16 is a diagram of an example collision detection process. In one embodiment, an AP may identify collisions within an AP directional receive interval. For example, the AP may identify collisions directly within the AP directional receive interval by performing energy detection on an (e.g., each) STS 1601 before decoding the STS. If the STS energy is below a threshold 1602, an STA may not access the STS and the AP may use the number of empty STSs identified to adapt/reduce the number of STSs for a beam 1603. As the number of empty STSs increases, the number of STSs scheduled for the beam (e.g., that specific beam) may be reduced. In one example, the NSTS may be reduced if the number of empty STSs is greater than NSTS_reduce_threshold. If the STS energy is above a threshold 1604 and/or the STS contains decodable information 1605, the AP may identify the STA and/or may send an ACK during the sector ACK interval to the STA 1606. If the STS energy is above a threshold, and/or the STS does not contain decodable information 1607, the AP may identify a collision and the AP may send a collision detected flag or indicator during the sector ACK interval 1608. The collision detected flag or indicator may enable STAs that sent information to the AP and/or did not get an ACK back to confirm that there may have been a collision. The STAs may request additional channel access and/or retry obtaining feedback. The AP may use the collision identified to adapt/increase the number of STSs for a beam 1609. In one example, the NSTS may be increased if the number of STSs with collisions is greater than NSTS_increase_threshold. The energy threshold defined for collision identification may be fixed by specification or adapted by the specification, for example, to estimate the number of STAs that were involved in a collision. For example, the AP may direct a STA to send a frame at a desired received signal strength indicator (RSSI) to a set of power controlled STAs. The received energy (or RSSI) may be used to estimate the number of STAs involved in the collision. This process may repeat 1610 as necessary, and/or for each selected STS that may undergo energy detection.

Figure 17:
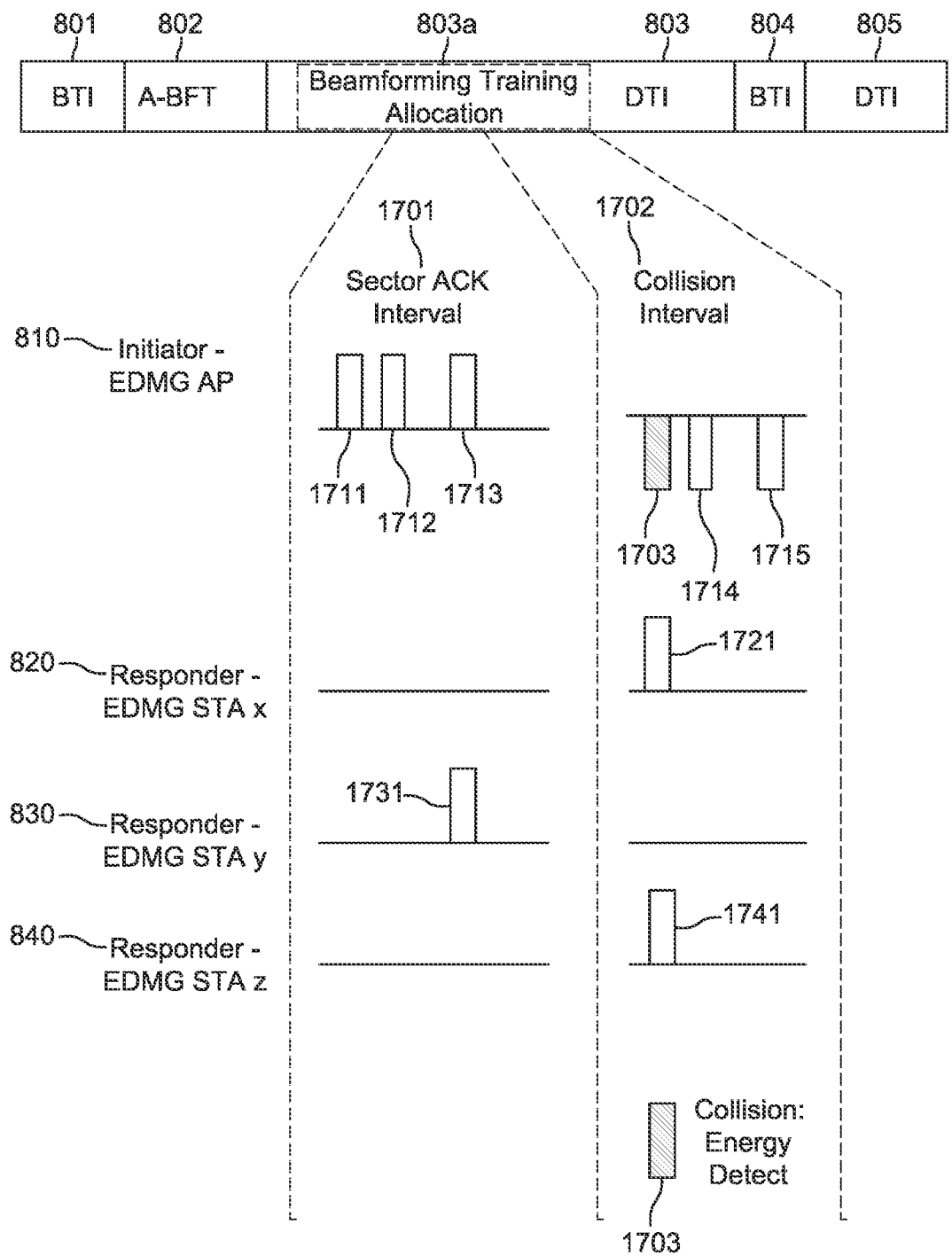
FIG. 17 illustrates an example of collision interval for collision identification.

FIG. 17 is a diagram showing an example of collision interval for a collision identification scenario. FIG. 17 is similar to FIG. 8 in so far as elements are similarly numbered. FIG. 17 differs, however, in showing a Sector ACK Interval 1701, wherein a number of ACK in STS 1711, 1712, and 1713 are sent by the initiator EDMG AP 810. The ACK interval 1701 may inform STAs 820, 830, and 840 whether the AP 810 received transmissions. In one example, an (e.g., each) STA, such as STA 830, that does not receive sector ACK may transmit a signal 1731 to the AP, for example, when the STA's desired sector is receiving.

Also in FIG. 17, there may be a collision identifier interval 1702 that may be sent after the sector ACK interval 1701, for example, to identify if there are collisions during the AP 810 directional reception. The AP/PCP 810 may repeat the sector sweep in the same order as in the BTI and/or in the RX mode, for example, in the collision identification interval (e.g., an updated collision identification interval). For example, in STS 1703 the AP 810 detects a collision based on energy detect from the signals 1721 and 1741 sent by STAs 820 and 840, respectively.

In one or more embodiments, a STA-specific orthogonal, pseudo-random or semi-orthogonal sequence may be appended to the end of the STA response frame (e.g., the short sector sweep frame). As an example, in an OFDM waveform scenario, an (e.g., each) STA may be assigned sub-carriers (e.g., specific sub-carriers) to transmit on. The AP may identify STAs that transmitted by identifying sub-carriers/sub-carrier groups (e.g., with energy on the subcarriers/sub-carrier groups). The AP may be allowed to identify (e.g., separately identify) STAs if a collision occurs.

Figure 18:
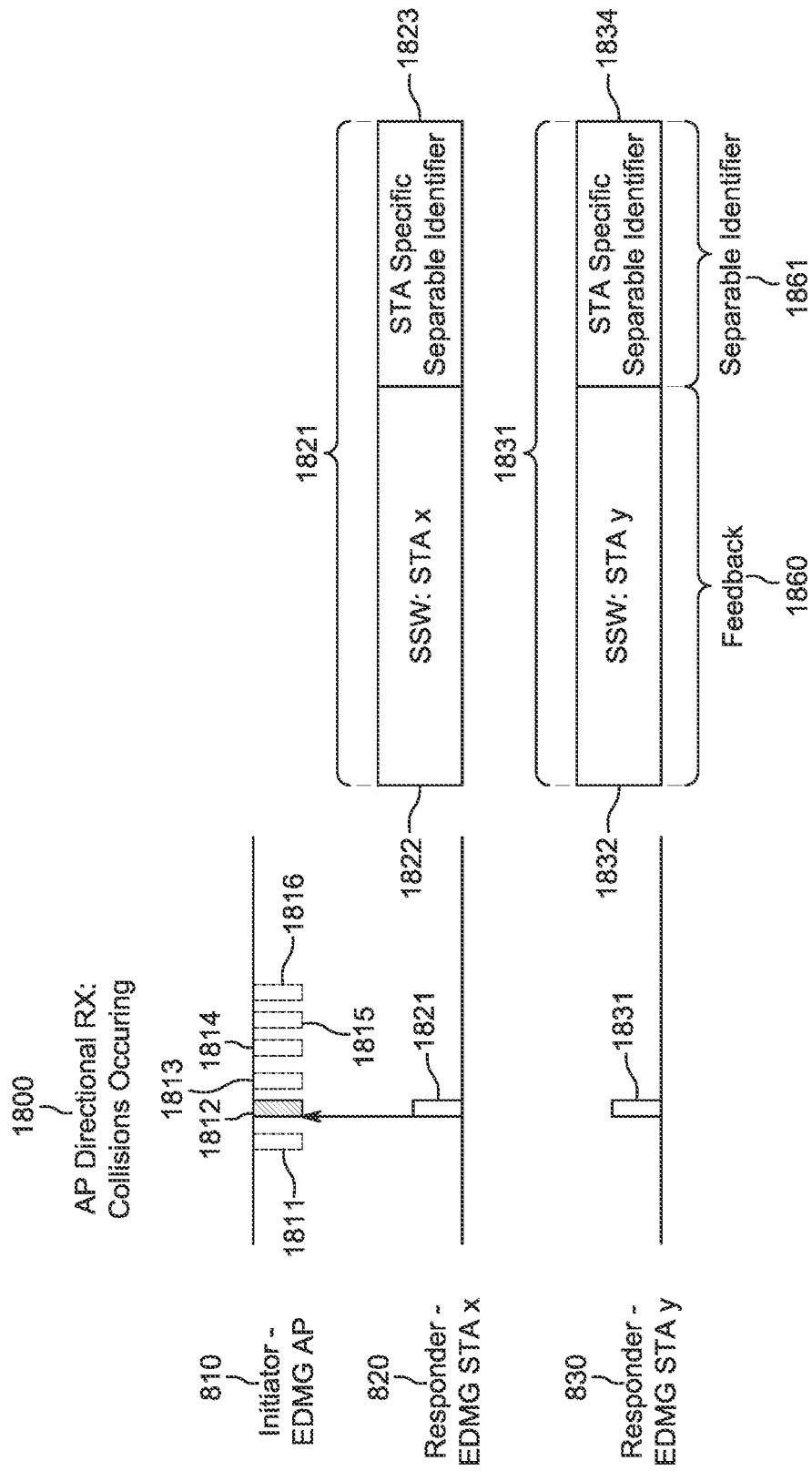
FIG. 18. illustrates an example of station (STA) specific identifier for STA specific collision identification.

FIG. 18 is a diagram of an example implementing a STA specific identifier for STA specific collision identification. A signal transmitted may be specific to a STA and/or enable identification of the STA based on an orthogonal or semi-orthogonal code. FIG. 18 may be similar to FIG. 8 in so far as elements are similarly numbered. FIG. 18 differs, for example, in showing an AP directional RX where collisions are occurring 1800. In a given interval/frame, there may be a number of STS 1811, 1812, 1813, 1814, 1815, and 1816. A collision may be detected at STS 1812 as a result of a signal sent by STA 820 and STA 830 because each signal may have a feedback portion 1860 and a separable identifier 1861 which may enable the AP 810 to identify which signal belongs to each STA. For example, the STA 820 signal 1821 may comprise a SSW 1822 and a STA specific separable identifier 1823. Similarly, the STA 830 signal 1831 may comprise a SSW 1832 and a STA specific identifier 1834.

FIGS. 19, 18, and 20 are signal configurations relating to collision recovery. In one or more embodiments, a PCP/AP may schedule additional slots for the sector that PCP/AP identifies as having collisions for a (e.g., the next) beamforming training allocation period by incrementing the number of STS in the AP directional reception interval. In one instance, a PCP may create a beam collision recovery interval (e.g., immediately after the sector ACK). In another instance, an AP may send additional feedback scheduling information within the sector ACK interval for specific sectors (e.g., only collision sectors) concerning collision identification within a AP directional receive interval.

FIG. 19 is a signal configuration example for a sector ACK frame with equal collision recovery STSs. In the example shown in FIG. 19, there may be a sector ACK header 1901 followed by the STA acknowledgement for each STA, such as STA 1 ACK 1902 all the way 1903 to an Nth STA ACK 1904. When beam collision is enabled, there may be a field 1905 to indicate that a collision is present.

In a scenario where the AP is not able to identify the STAs (e.g., the specific STAs), the AP may signal if there has been a collision or not. The AP may signal information to enable a beam recovery interval (e.g., immediately after the sector ACK) and/or to enable the STAs to retry obtaining feedback. The AP may also signal additional STS opportunities for the collision sectors. In order to do this, there may be a field to identify the sectors that the AP has identified as having had collisions (e.g., the collision sectors). For example, the number of STS 1907 for a beam may be equal to reduce signaling complexity, in which case the number of previous beams 1906 and the number of STS 1907 is included in the signal.

FIG. 20 illustrates an example of sector ACK frame with collision beam specific recovery STS. In one or more embodiments, the number of STSs for a collision sector may be collision sector specific. FIG. 20 may be similar to FIG. 19 in that elements 1901-1904 are the same as elements 2001-2004. FIG. 20 differs from FIG. 19, however, because it represents a scenario where the number of STS per collision sector may be collision sector specific. The AP may signal information that a collision is present 2005 to enable a beam recovery interval (e.g., immediately after the sector ACKs) and/or to enable the STA to retry obtaining the feedback. The AP may send the STS start index 2006 and number of STSs 2007 which indicate that the AP may go into another set of STSs with specific beams on a specific STS so that the STA knows when to try again to recover from the collisions.

FIG. 21 is a signal configuration of an example sector ACK frame with collision identification and STA specific beam collision/recovery signaling. FIG. 21 may be similar to FIG. 19 in that elements 1901-1904 are the same as elements 2101-2104. FIG. 21 differs from FIG. 19, however, because it represents a scenario where the AP is able to identify a STA with the collision (e.g., specific STAs), and the AP may signal if there has been a collision or not and/or signal information to the STA informing the STA that there has been a collision. For example, in FIG. 21 STA 1 a collision is indicated in 2106, and this is repeated 2107 as necessary, until the nth STA that collided 2108 has been reported. The AP may poll an STA (e.g., each STA individually) or send information to an STA (e.g., each) indicating the STS the STA may use to send information during the recovery.

In one or more embodiments, the PCP/AP may schedule additional feedback during a directional allocation region, for example, on identifying collisions within a beam. The directional allocation region may include a region in the DTI. In the DTI, the PCP/AP may specify the AP's receive sector that the PCP/AP may use to listen during the allocation. In the interval, one or more of dedicated feedback using SPs (and e.g., STA specific STSs SPs) and/or contention based feedback using CBAPs (or e.g., scheduled STSs) may be used. Additionally, the PCP/AP may schedule additional slots for the sector it identifies as having collisions during the next BTA period by incrementing the number of STS in the AP directional reception interval.

From an STA perspective, this means that an STA may consider the feedback received from the AP/PCP so that it may respond in the additional STS in the next BTA period, where the feedback may occur based on anyone of the embodiments, or combination of embodiments, as discussed herein. For example, if an ACK is not received by a STA, and the AP provides additional STS due to collisions, then the STA may try again in the next BTA for the sector the PCP/AP identified as having collisions.

In one or more embodiments, unassociated STAs may need a procedure for being addressed by an AP during an enhanced SLS situation. An unassociated STA may respond to the SLS in the AP directional reception region. Unassociated STAs may not have an AID in the SSW frame to enable the AP to identify the unassociated STAs. To identify the unassociated STAs, the STAs may respond using one or more procedures.

In one example, the STAs may respond using a fixed Association ID (AID). The fixed AID may inform the AP to initiate association within the reception sector.

In another example, the STAs may respond using a fixed AID with a random number generated to identify the STA (e.g., the specific STA). The fixed AID with a random number generated may enable the AP and/or the STA to identify each other. The fixed AID with a random number generated may inform the AP that the AP may commence an association implementation for the STA (e.g., the specific STA). The STAs may respond using random selection of an AID (e.g., from a preselected set of AIDs).

In another example, random selection of an AID may enable the AP and/or STA to identify each other. Random selection of an AID may inform the AP that the AP may commence the association implementation for the STA (e.g., the specific STA).

Figure 22:
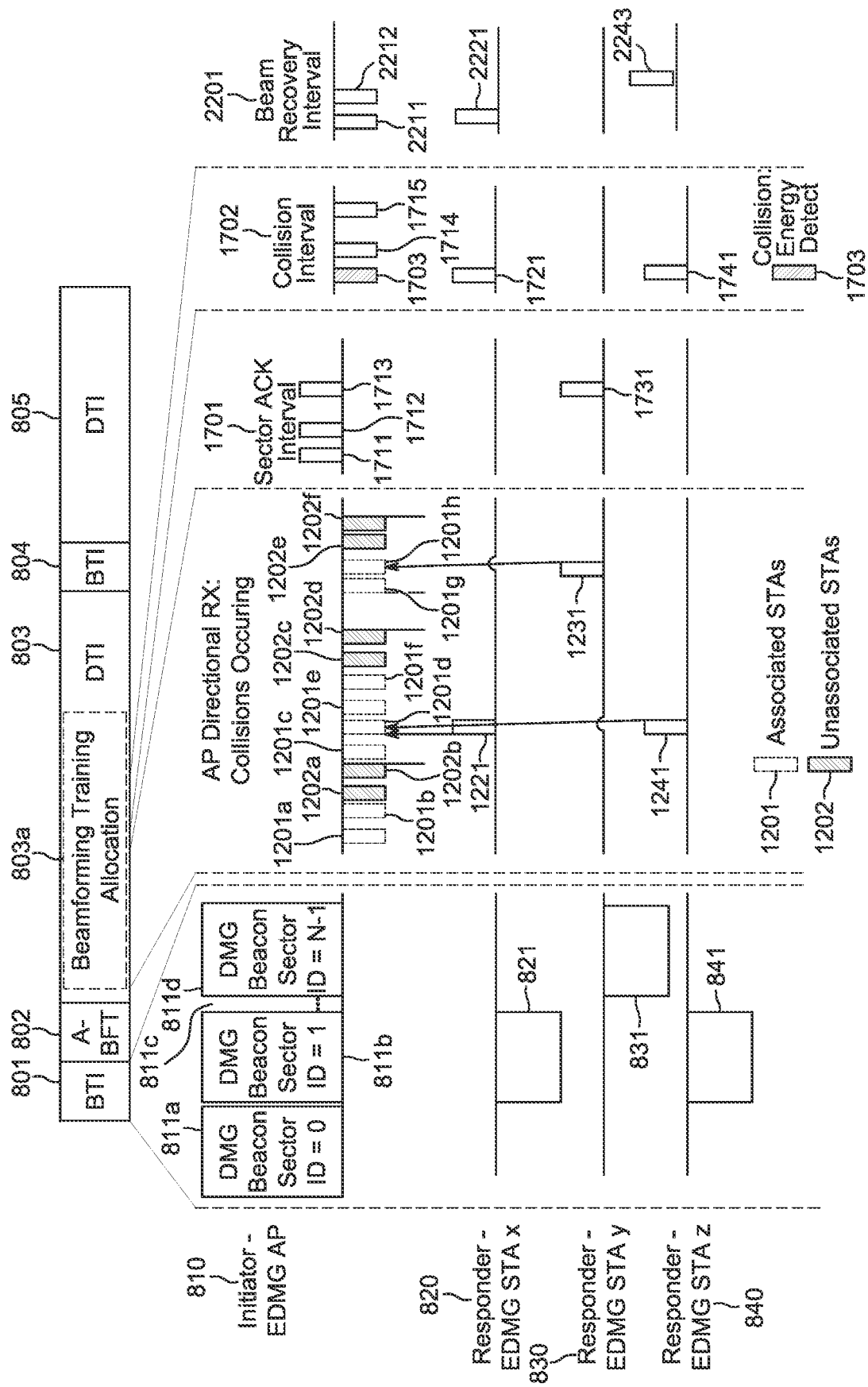
FIG. 22 illustrates an example of enhanced SLS implementation.

FIG. 22 is a diagram showing one or more of the embodiments described herein concerning an enhanced SLS procedure(s). Like numbering from other figures may be considered to be the same or similar elements. In one or more embodiments, the unassociated STAs may use an STS (e.g., any of the STS available). Alternatively, the unassociated STAs may use a reserved set of STSs, such as those shaded STS 1202. In one example, the unassociated STAs may access a set of STSs, such as those STS with solid lines (e.g., with lower priority) to minimize collision with the associated STAs.

As discussed with regard to FIGS. 19, 20, and 21, for a Beam Recovery Interval 2201, the AP/PCP 810 may send feedback 2211 and 2212 after a collision, so that STAs, such as 821 as 841, may retry transmission 2221 and 2243, respectively.

Although the features and elements of the present invention are described in the preferred embodiments in particular combinations, each feature or element may be used alone without the other features and elements of the preferred embodiments or in various combinations with or without other features and elements of the present invention. Although the solutions described herein consider 802.11 specific protocols, it is understood that the solutions described herein are not restricted to this scenario and are applicable to other wireless systems as well. Throughout the solutions and provided examples, the blank areas in the figures may imply that there is no restriction for this area and any solution can be employed.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and/or removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A method implemented at a responder, the method comprising:
   receiving, from an initiator, an indication of a number of slots for communicating in a sector of the initiator;
   sending a signal in one or more slots of the indicated number of slots for communicating in the sector of the initiator based on a generated random number being less than the number of slots for communicating in the sector of the initiator; and
   receiving an acknowledgement (ACK) confirming the signal was received by the initiator.

2. The method of claim 1, wherein the ACK is received in a sector of a sector sweep.

3. The method of claim 1, wherein the responder is an enhanced directional multi-gigabit (EDMG) station.

4. The method of claim 1, wherein the signal is sent in a direction based on training that occurred during a beacon transmission interval (BTI).

5. The method of claim 1, wherein the number of slots for communicating in the sector of the initiator is an equal or unequal number compared to another sector.

6. The method of claim 1, wherein the slots for communicating in the sector of the initiator are space time slots (STSs).

7. The method of claim 1, wherein the initiator that sent the indication of the number of slots for communicating in the sector is associated with the responder.

8. The method of claim 1, wherein the initiator that sent the indication of the number of slots for communicating in the sector is unassociated with the responder.

9. The method of claim 1, wherein a beacon frame comprises the indication of the number of slots for communicating in the sector of the initiator, and wherein the method further comprises receiving the beacon frame from the initiator.

10. The method of claim 9, wherein the number of slots is indicated in a field of the beacon frame.

11. The method of claim 10, wherein the beacon frame is a directional multi-gigabit (DMG) beacon frame.

12. The method of claim 1, wherein the slots are associated with a beam training allocation.

13. The method of claim 12, wherein the beam training allocation is an asymmetric beamforming training allocation.

14. The method of claim 1, wherein sending the signal in the one or more slots from the indicated number of slots based on the generated random number being less than the number of slots for communicating in the sector of the initiator comprises:
   generating the random number; and
   comparing the generated random number to the indicated number of slots.

15. A wireless transmit receive unit (WTRU) configured to operate as a responder, the WTRU comprising:
   a transceiver; and
   a processor configured to:
   receive, from an initiator via the transceiver, an indication of a number of slots for communicating in a sector of the initiator;
   send, via the transceiver, a signal in one or more slots of the indicated number of slots for communicating in the sector of the initiator based on a generated random number being less than the number of slots for communicating in the sector of the initiator; and
   receive an acknowledgement (ACK) from the initiator.

16. The WTRU of claim 15, wherein the ACK is received in a sector of a sector sweep.

17. The WTRU of claim 15, wherein the WTRU is an enhanced directional multi-gigabit (EDMG) station.

18. The WTRU of claim 15, wherein the signal is sent in a direction based on training that occurred during a beacon transmission interval (BTI).

19. The WTRU of claim 15, wherein the number of slots for communicating in the sector of the initiator is an equal or unequal number compared to another sector.

20. The WTRU of claim 15, wherein the slots for communicating in the sector are space time slots (STSs).

21. The WTRU of claim 15, wherein the initiator that sent the indication of the number of slots for communicating in the sector is associated with the WTRU.

22. The WTRU of claim 15, wherein the initiator that sent the indication of the number of slots for communicating in the sector is unassociated with the WTRU.

23. The WTRU of claim 15, wherein a beacon frame comprises the indication of the number of slots for communicating in the sector of the initiator, and wherein the processor is configured to receive the beacon frame via the transceiver.

24. The WTRU of claim 23, wherein the number of slots is indicated in a field of the beacon frame.

25. The WTRU of claim 24, wherein the beacon frame is a directional multi-gigabit (DMG) beacon frame.

26. The WTRU of claim 15, wherein the slots are associated with a beam training allocation.

27. The WTRU of claim 26, wherein the beam training allocation is an asymmetric beamforming training allocation.

28. The WTRU of claim 15, wherein the processor being configured to send the signal in one or more slots from the indicated number of slots based on the generated random number being less than the number of slots for communicating in the sector of the initiator further comprises the processor being configured to:
  generate the random number; and
  compare the generated random number to the indicated number of slots.

* * * * *